United States Patent
Filippov et al.

(10) Patent No.: US 11,968,362 B2
(45) Date of Patent: *Apr. 23, 2024

(54) METHOD AND APPARATUS FOR INTERPOLATION FILTERING FOR INTRA- AND INTER-PREDICTION IN VIDEO CODING

(71) Applicant: HUAWEI TECHNOLOGIES CO., LTD., Guangdong (CN)

(72) Inventors: Alexey Konstantinovich Filippov, Moscow (RU); Jianle Chen, San Diego, CA (US); Vasily Alexeevich Rufitskiy, Moscow (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/877,492

(22) Filed: Jul. 29, 2022

(65) Prior Publication Data

US 2022/0385900 A1    Dec. 1, 2022

Related U.S. Application Data

(63) Continuation of application No. 17/142,170, filed on Jan. 5, 2021, now Pat. No. 11,405,612, which is a (Continued)

(51) Int. Cl.
H04N 19/117      (2014.01)
H04N 19/176      (2014.01)

(52) U.S. Cl.
CPC ......... *H04N 19/117* (2014.11); *H04N 19/176* (2014.11)

(58) Field of Classification Search
USPC .................................................. 375/240.29
See application file for complete search history.

(56) References Cited

U.S. PATENT DOCUMENTS 8,942,505 B2    1/2015 Andersson et al.
9,693,070 B2    6/2017 Budagavi et al.
(Continued)

FOREIGN PATENT DOCUMENTS

CN    106416243 A    2/2017
CN    106797477 A    5/2017
(Continued)

OTHER PUBLICATIONS

I.-K. Kim, S. Lee, Y. Piao and J. Chen, "Coding efficiency comparison of new video coding standards: HEVC vs VP9 vs AVS2 video," 2014 IEEE International Conference on Multimedia and Expo Workshops (ICMEW), Chengdu, China, 2014, pp. 1-6, doi: 10.1109/ICMEW.2014.6890700. (Year: 2014).*

(Continued)

*Primary Examiner* — Stuart D Bennett
(74) *Attorney, Agent, or Firm* — HUAWEI TECHNOLOGIES CO., LTD.

(57) ABSTRACT

A method of video coding, wherein the method comprises inter-prediction processing of a first block, wherein the inter-prediction processing comprises subpixel interpolation filtering of samples of a reference block; intra-prediction processing of a second block, wherein the intra-prediction processing comprises subpixel interpolation filtering of reference samples; wherein the method further comprises selecting interpolation filter coefficients for the subpixel interpolation filtering based on a subpixel offset between integer reference sample positions and fractional reference samples' positions, wherein for the same subpixel offsets the same interpolation filter coefficients are selected for intra-prediction processing and inter-prediction processing.

15 Claims, 20 Drawing Sheets

Related U.S. Application Data continuation of application No. PCT/RU2019/050141, filed on Sep. 6, 2019.

(60) Provisional application No. 62/728,666, filed on Sep. 7, 2018.

(56) References Cited

U.S. PATENT DOCUMENTS

| | | | |
|---|---|---|---|
| 9,838,662 | B2 | 12/2017 | Zhang et al. |
| 2014/0078394 | A1 | 3/2014 | Lou et al. |
| 2015/0071357 | A1 | 3/2015 | Pang et al. |
| 2016/0057420 | A1 | 2/2016 | Pang et al. |
| 2016/0360210 | A1* | 12/2016 | Xiu .............. H04N 19/184 |
| 2016/0373743 | A1 | 12/2016 | Zhao et al. |
| 2017/0099490 | A1* | 4/2017 | Seregin .............. H04N 19/159 |
| 2017/0150180 | A1 | 5/2017 | Lin et al. |
| 2017/0310961 | A1 | 10/2017 | Liu et al. |
| 2018/0027255 | A1 | 1/2018 | Alshina et al. |
| 2018/0063531 | A1* | 3/2018 | Hu .............. H04N 19/42 |
| 2018/0098066 | A1* | 4/2018 | Lee .............. H04N 19/523 |
| 2018/0176596 | A1* | 6/2018 | Jeong .............. H04N 19/176 |
| 2019/0246110 | A1* | 8/2019 | Xu .............. H04N 19/523 |

FOREIGN PATENT DOCUMENTS

| | | |
|---|---|---|
| CN | 108141604 A | 6/2018 |
| CN | 108496367 A | 9/2018 |
| CN | 112425169 A | 2/2021 |
| WO | 2008085109 A1 | 7/2008 |
| WO | 2015113510 A1 | 8/2015 |
| WO | 2017058633 A1 | 4/2017 |

OTHER PUBLICATIONS

Chen et al., "Further Improvements to HMKTA-1.0", 52nd Meeting, Jun. 9 through 26, 2015, Warsaw, PL; ITU—Telecommunications Standardization Sector Study Group 16 Question 6 Video Coding Experts Group (VCEG), VCEG-AZ07, Jun. 19, 2015, 8 pp. (Year: 2015).*

Document: JVET-K0207-v1, Maxim Sychev et al, CE4: Enhanced Chroma Interpolation Filter (Test 7.1), Joint Video Experts Team (JVET) of ITU-T SG 16 WP 3 and ISO/IEC JTC 1/SC 29/WG 11, 11th Meeting: Ljubljana, SI, Jul. 10-18, 2018, total 3 pages.

Document: JVET-L0628-v2, Alexey Filippov et al, CE3: A combination of tests 3.1.2 and 3.1.4 for intra reference sample interpolation filter, Joint Video Experts Team (JVET) of ITU-T SG 16 WP 3 and ISO/IEC JTC 1/SC 29/WG 11, 12th Meeting: Macao, MO, Oct. 3-12, 2018, total 5 pages.

Document: JCTVC-U0142, A.M. Tourapis et al, Inter/Intra Block Copy Unification: Comments and Observations, Joint Collaborative Team on Video Coding (JCT-VC) of ITU-T SG 16 WP 3 and ISO/IEC JTC I/SC 29/WG11, 21st Meeting: Warsaw, PL, Jun. 19-26, 2015, total 3 pages.

Document: JCTVC-U0080r1, Krishna Rapaka et al, On Chroma MV derivation for intra block copy for non-444, Joint Collaborative Team on Video Coding (JCT-VC) of ITU-T SG 16 WP 3 and ISO/IEC JTC 1/SC 29/WG11, 21st Meeting: Warsaw, PL, Jun. 19-26, 2015, total 3 pages.

Document: JVET-F0051, Jicheng An et al, Unified Adaptive Loop Filter for Luma and Chroma, Joint Video Exploration Team (JVET) of ITU-T SG 16 WP 3 and ISO/IEC JTC 1/SC 29/WG11, 6th Meeting: Hobart, AU, Mar. 31-Apr. 7, 2017, total 9 pages.

Document: JVET-L1001-v5, Benjamin Bross et al, Versatile Video Coding(Draft 3), Joint Video Experts Team (JVET) of ITU-T SG 16 WP 3 and ISO/IEC JTC 1/SC 29/WG 11, 12th Meeting: Macao, CN, Oct. 3-12, 2018, total 193 pages.

Benjamin Bross et al, Versatile Video Coding (Draft 2). Joint Video Experts Team (JVET) of ITU-T SG 16 WP 3 and ISO/IEC JTC 1/SC 29/WG 11, 11th Meeting: Ljubljana, SI, 10 Jul. 18, 2018, JVET-K1001 v4, 86 pages.

Xiaozhong Xu et al, Intra Block Copy in HEVC Screen Content Coding Extensions. IEEE Journal on Emerging and Selected Topics in Circuits and Systems, vol. 6, No. 4, Dec. 2016, 11 pages.

Geert Van der Auwera et al, Description of Core Experiment 3: Intra Prediction and Mode Coding. Joint Video Experts Team (JVET) of ITU-T SG 16 WP 3 and ISO/IEC JTC 1/SC 29/WG 11, 11th Meeting: Ljubljana, SI, 10 Jul. 18, 2018, JVET-K1023-v2, 34 pages.

Geert Van der Auwera et al, CE3-related: On MDIS and intra interpolation filter switching. Joint Video Experts Team (JVET) of ITU-T SG 16 WP 3 and ISO/IEC JTC 1/SC 29/WG 11, 11th Meeting: Ljubljana, SI, 10 Jul. 18, 2018, JVET-K0064-v2, 7 pages.

Virginie Drugeon et al, CE3: DC mode without divisions and modifications to intra filtering (Tests 1.2.1, 2.2.2 and 2.5.1). Joint Video Experts Team (JVET) of ITU-T SG 16 WP 3 and ISO/IEC JTC 1/SC 29/WG 11, 11th Meeting: Ljubljana, SI, 10 Jul. 18, 2018, JVET-K0211-v1, 9 pages.

Han Huang et al, EE2.1: Quadtree plus binary tree structure integration with JEM tools. Joint Video Exploration Team (JVET) of ITU-T SG 16 WP 3 and ISO/IEC JTC 1/SC 29/WG 11, 3rd Meeting: Geneva, CH, May 26, Jun. 1, 2016, JVET-C0024, 5 pages.

Jianle Chen et al, JVET AHG report: JEM algorithm description editing (AHG2). Joint Video Exploration Team (JVET) of ITU-T SG 16 WP 3 and ISO/IEC JTC 1/SC 29/WG 11, 4th Meeting: Chengdu, CN, 15 Oct. 21, 2016, JVET-D0002, 3 pages.

Ai da et al, advance of 360-degree video coding for virtual reality: a survey, Jun. 2018, 7 pages.

* cited by examiner

METHOD AND APPARATUS FOR INTERPOLATION FILTERING FOR INTRA- AND INTER-PREDICTION IN VIDEO CODING

CROSS-REFERENCE TO RELATED APPLICATIONS

This application is a continuation of U.S. patent application Ser. No. 17/142,170, filed on Jan. 5, 2021, which is a continuation of International Application No. PCT/RU2019/050141, filed on Sep. 6, 2019, The International Application claims priority to U.S. Provisional Patent Application No. 62/728,666, filed Sep. 7, 2018. All of the afore-mentioned patent applications are hereby incorporated by reference in their entireties.

TECHNICAL FIELD

The present disclosure relates to the technical field of image and/or video coding and decoding, and in particular to a method and apparatus for interpolation filtering used for intra- and inter-prediction.

BACKGROUND

Digital video has been widely used since the introduction of DVD-discs. A video is encoded and transmitted using a transmission medium. A viewer receives the video, and a viewing device is used to decode and display the video. Over the years the quality of video has improved, for example, due to higher resolutions, color depths and frame rates. This has lead to larger data streams that are nowadays commonly transported over the internet and mobile communication networks.

Higher resolution videos, however, typically require more bandwidth as they have more information. In order to reduce bandwidth requirements, video coding standards involving compression of the video have been introduced. As the video is encoded, the bandwidth requirements (or corresponding memory requirements in case of storage) are reduced. Often this reduction comes at the cost of quality. Thus, the video coding standards try to find a balance between bandwidth requirements and quality.

The High Efficiency Video Coding (HEVC) is an example of a video coding standard that is commonly known to persons skilled in the art. In HEVC, a coding unit (CU) is split into prediction units (PU) or transform units (TUs). The Versatile Video Coding (VVC) next generation standard is the most recent joint video project of the ITU-T Video Coding Experts Group (VCEG) and the ISO/IEC Moving Picture Experts Group (MPEG) standardization organizations, working together in a partnership known as the Joint Video Exploration Team (JVET). VVC is also referred to as ITU-T H.266/Next Generation Video Coding (NGVC) standard. In VVC, the concepts of multiple partition types may be removed, i.e. the separation of the CU, PU and TU concepts except as needed for CUs that have a size too large for the maximum transform length, and supports more flexibility for CU partition shapes.

Processing of these coding units (CUs) (also referred to as blocks) depends on their size, spatial position and a coding mode specified by an encoder. Coding modes can be classified into two groups according to the type of prediction: intra-prediction and inter-prediction modes. Intra prediction modes use samples of the same picture (also referred to as frame or image) to generate reference samples, to calculate the prediction values for samples of a block being reconstructed. Intra prediction is also referred to as spatial prediction. Inter-prediction modes are designed for temporal prediction and use reference samples of previous, current (same) or next picture to predict samples of the block of the current picture.

ITU-T VCEG (Q6/16) and ISO/IEC MPEG (JTC 1/SC 29/WG 11) are studying the potential need for standardization of future video coding technology with a compression capability, that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area.

The VTM (Versatile Test Model) standard uses 35 Intra modes whereas the BMS (Benchmark Set) uses 67 Intra modes.

The intra mode coding scheme currently described in BMS is considered complex and a disadvantage of non-selected mode set is that the index list is always constant and not adaptive based on the current block properties (e.g. its neighboring blocks INTRA modes).

SUMMARY

An apparatus and a method for interpolation filtering for intra- and inter-prediction are disclosed. The apparatus and method use a same sample interpolation process to unify the calculation procedure for inter- and intra prediction, which allows to improve coding efficiency. The scope of protection is defined by the claims.

The foregoing and other objects are achieved by the subject matter of the independent claims. Further implementation forms are apparent from the dependent claims, the description and the figures.

Particular embodiments are outlined in the attached independent claims, with other embodiments in the dependent claims.

According to a first aspect, the disclosure relates a method of video coding, wherein the method comprises:
   inter-prediction processing of a first block (of a picture or video), wherein the inter-prediction processing comprises (for fractional positions) subpixel interpolation filtering of samples of a reference block (of or for the first block);
   intra-prediction processing of a second block (of the picture or video), wherein the intra-prediction processing comprises (for fractional positions) subpixel interpolation filtering of reference samples (of or for the second block];
wherein the method further comprises
   selecting interpolation filter coefficients for the subpixel interpolation filtering based on a subpixel offset between integer reference sample positions and fractional reference samples' positions, wherein for the same subpixel offsets the same interpolation filter coefficients are selected for intra-prediction processing and inter-prediction processing.

Subpixel interpolation filtering is performed for fractional, i.e. non-integer, reference sample positions as the respective values are typically not available, e.g. from a decoded picture buffer (DPB). Values of integer reference sample positions are typically directly available, e.g. from a DPB, and thus no interpolation filtering is required to obtain those values. Methods according to the first aspect may also be referred to as methods for inter- and intra-prediction processing for video coding, or methods for subpixel interpolation filtering for inter- and intra-prediction processing for video coding.

In implementation forms according to the first aspect, the method may, for example, comprise, selecting a first set of interpolation filter coefficients (e.g. $c_0$ to $c_3$) for the subpixel interpolation filtering for inter-prediction (e.g. of chroma samples) based on a first subpixel offset between integer reference sample positions and fractional reference samples' positions, and selecting the same first set of interpolation filter coefficients ($c_0$ to $c_3$) for the subpixel interpolation filtering for intra-prediction (e.g. of luma samples) if the subpixel offset is the same as the first subpixel offset.

In a possible implementation form of the method according to the first aspect, the selected filter coefficients are used for the subpixel interpolation filtering of chroma samples for inter-prediction processing and of luma samples for intra-prediction processing.

In a possible implementation form of the method according to the first aspect, the inter-prediction processing is an intra block copy processing.

In a possible implementation form of the method according to the first aspect, the interpolation filtering coefficients used in the inter-prediction processing and intra-prediction processing are fetched from a look-up table.

In a possible implementation form of the method according to the first aspect, a 4 tap filter is used for the subpixel interpolation filtering.

In a possible implementation form of the method according to the first aspect, the selecting the interpolation filter coefficients comprises selecting the interpolation filter coefficients based on the below association between subpixel offsets and interpolation filter coefficients:

| Subpixel offset | $c_0$ | $c_1$ | $c_2$ | $c_3$ |
| --- | --- | --- | --- | --- |
| 0 (integer) | 0 | 64 | 0 | 0 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 (half-pel) | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 | wherein the subpixel offsets are defined in 1/32 subpixel resolution and $c_0$ to $c_3$ represent the interpolation filter coefficients.

In a possible implementation form of the method according to the first aspect, the selecting the interpolation filter coefficients comprises selecting the interpolation filter coefficients for fractional positions based on the below association between subpixel offsets and interpolation filter coefficients:

| Subpixel offset | $c_0$ | $c_1$ | $c_2$ | $c_3$ |
| --- | --- | --- | --- | --- |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 (half-pel) | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 | wherein the subpixel offsets are defined in 1/32 subpixel resolution and $c_0$ to $c_3$ represent the interpolation filter coefficients.

According to a second aspect, the disclosure relates a method of video coding that obtains predicted sample values of a current coding block, wherein the method comprises: when predicted samples of a current coding block are obtained using an inter-prediction process, performing the following processes (or steps) to obtain an inter-predicted sample value, obtaining filter coefficients based on a first sub-pixel offset value from a look up table, obtaining the inter-predicted sample value according to the filter coefficients; and when predicted samples of the current coding block are obtained using an intra-prediction process, performing the following processes (or steps) to obtain an intra-predicted sample value, obtaining filter coefficients based on a second sub-pixel offset value from a look up table, wherein the look up table used for inter prediction is reused for intra prediction, obtaining the intra-predicted sample value according to the filter coefficients.

As described for the first aspect, subpixel interpolation filtering is performed for fractional, i.e. non-integer, reference sample positions as the respective values are typically not available, e.g. from a decoded picture buffer (DPB). Values of integer reference sample positions are typically directly available, e.g. from a DPB, and thus no interpolation filtering is required to obtain those values. Methods according to the second aspect may also be referred to as methods for inter- and intra-prediction processing for video coding, or methods for subpixel interpolation filtering for inter- and intra-prediction processing for video coding.

In a possible implementation form of the method according to the second aspect, wherein the filter coefficients from the look up table is used in fractional sample position interpolation for either intra prediction process or inter prediction process.

In a possible implementation form of the method according to the second aspect, the look up table used in or for the intra prediction process is the same as the look up table used in or for the inter prediction process.

In a possible implementation form of the method according to the second aspect, wherein the look up table is described as follows:

| Subpixel offset | $c_0$ | $c_1$ | $c_2$ | $c_3$ |
|---|---|---|---|---|
| 0 (integer) | 0 | 64 | 0 | 0 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 (half-pel) | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 | wherein "Subpixel offset" column is defined in 1/32 subpixel resolution, and c0, c1, c2, c3 are filter coefficients.

In a possible implementation form of the method according to the second aspect, the look up table is described as follows:

| Subpixel offset | $c_0$ | $c_1$ | $c_2$ | $c_3$ |
|---|---|---|---|---|
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 (half-pel) | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 | wherein "Subpixel offset" column is defined in 1/32 subpixel resolution, and c0, c1, c2, c3 are filter coefficients.

In a possible implementation form of the method according to the second aspect, the inter-predicted sample value is used for Chroma component of the current coding block.

In a possible implementation form of the method according to the second aspect, the intra-predicted sample value is used for Luma component of the current coding block.

In a possible implementation form of the method according to the second aspect, the look up table used in the intra prediction is selected, when a size of a main reference side used in intra prediction is smaller than or equal to a threshold.

In a possible implementation form of the method according to the second aspect, the threshold is 8 samples.

In a possible implementation form of the method according to the second aspect, the inter-prediction process is an intra block copy process.

According to a third aspect, the disclosure relates to an encoder comprising processing circuitry for performing a method according to the first aspect, the second aspect, any possible embodiment of the first aspect, or any possible embodiment of the second aspect.

According to a fourth aspect, the disclosure relates to a decoder comprising processing circuitry for performing a method according to the first aspect, the second aspect, any possible embodiment of the first aspect, or any possible embodiment of the second aspect.

According to a fifth aspect, the disclosure relates to an apparatus for decoding a video stream includes a processor and a memory. The memory is storing instructions that cause the processor to perform the method according to the first aspect, the second aspect, any possible embodiment of the first aspect, or any possible embodiment of the second aspect.

According to a sixth aspect, the disclosure relates to an apparatus for decoding a video stream includes a processor and a memory. The memory is storing instructions that cause the processor to perform the method according to the first aspect, the second aspect, any possible embodiment of the first aspect, or any possible embodiment of the second aspect.

According to a seventh aspect, a computer-readable storage medium having stored thereon instructions that when executed cause one or more processors configured to code video data is proposed. The instructions cause the one or more processors to perform a method according to the first aspect, the second aspect, any possible embodiment of the first aspect, or any possible embodiment of the second aspect.

According to an eight aspect, the disclosure relates to a computer program comprising program code for performing the method according to the first aspect, the second aspect, any possible embodiment of the first aspect, or any possible embodiment of the second aspect when executed on a computer.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments are described in more detail with reference to the attached figures and drawings, in which.

Figure 1:
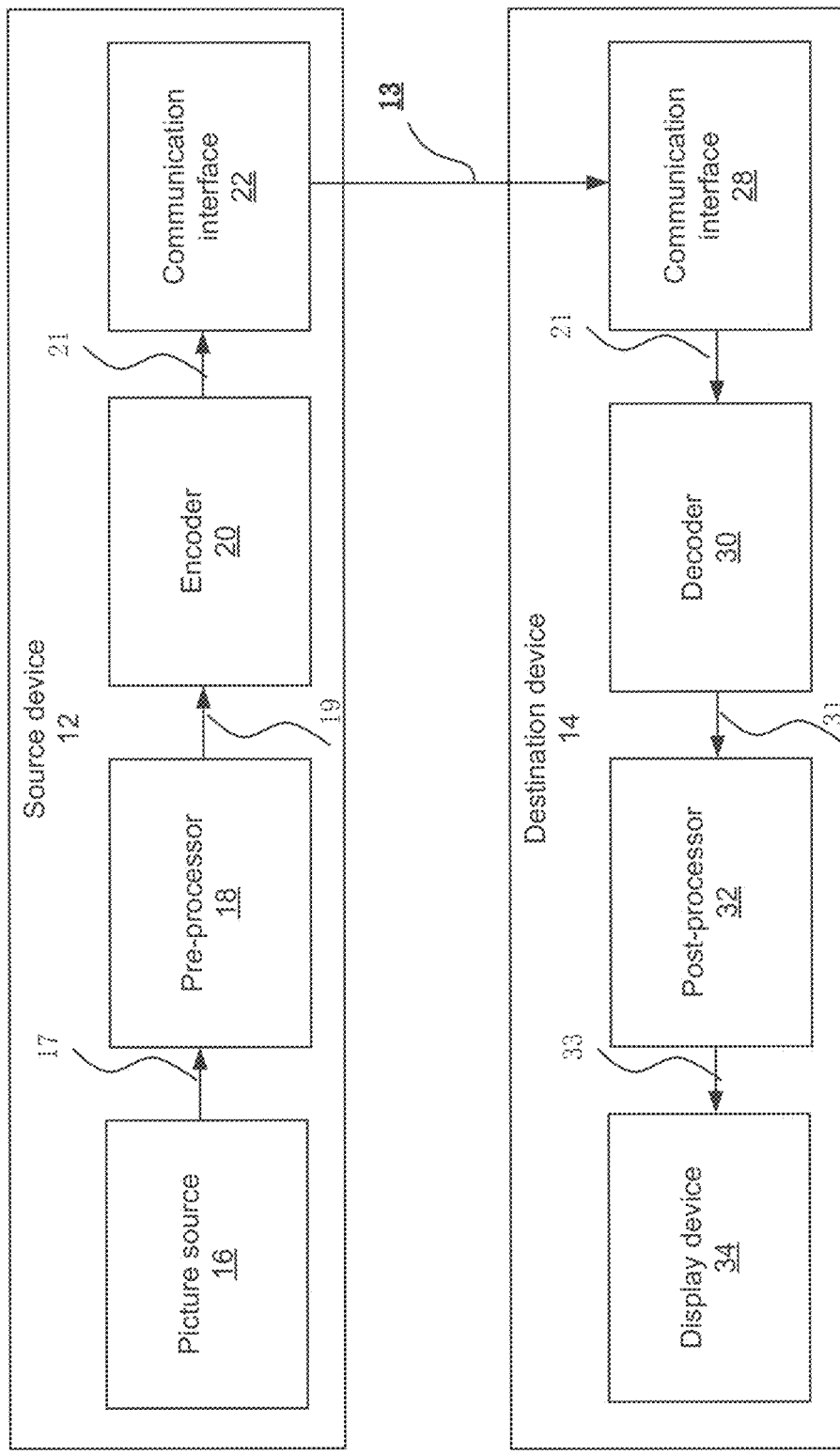
FIG. 1 is a block diagram showing an example of a video coding system configured to implement embodiments of the invention.

In the following identical reference signs refer to identical or at least functionally equivalent features if not explicitly specified otherwise.

DETAILED DESCRIPTION OF EMBODIMENTS

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Definitions of Acronyms & Glossary

JEM Joint Exploration Model (the software codebase for future video coding exploration)
JVET Joint Video Experts Team
LUT Look-Up Table
QT QuadTree
QTBT QuadTree plus Binary Tree
RDO Rate-distortion Optimization
ROM Read-Only Memory
VTM VVC Test Model
VVC Versatile Video Coding, the standardization project developed by JVET.
CTU/CTB—Coding Tree Unit/Coding Tree Block
CU/CB—Coding Unit/Coding Block
PU/PB—Prediction Unit/Prediction Block
TU/TB—Transform Unit/Transform Block
HEVC—High Efficiency Video Coding Video coding schemes such as H.264/AVC and HEVC are designed along the successful principle of block-based hybrid video coding. Using this principle a picture is first partitioned into blocks and then each block is predicted by using intra-picture or inter-picture prediction.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (picture block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is partially applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As used herein, the term "block" may a portion of a picture or a frame. For convenience of description, embodiments of the invention are described herein in reference to High-Efficiency Video Coding (HEVC) or the reference software of Versatile video coding (VVC), developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC. It may refer to a CU, PU, and TU. In HEVC, a CTU is split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. In the newest development of the video compression technical, Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree structure. The binary tree leaf nodes are called coding units (CUs), and that segmentation is used for prediction and transform processing without any further partitioning. This means that the CU, PU and TU have the same block size in the QTBT coding block structure. In parallel, multiply partition, for example, triple tree partition was also proposed to be used together with the QTBT block structure.

ITU-T VCEG (Q6/16) and ISO/IEC MPEG (JTC 1/SC 29/WG 11) are studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area.

The VTM (Versatile Test Model) uses 35 Intra modes whereas the BMS (Benchmark Set) uses 67 Intra modes. Intra-prediction is a mechanism used in many video coding frameworks to increase compression efficiency in the cases where only a given frame can be involved.

Video coding as used herein refers to the processing of a sequence of pictures, which form the video or video sequence. The term picture, image or frame may be used/are used synonymously in the field of video coding as well as in this application. Each picture is typically partitioned into a set of non-overlapping blocks. The encoding/decoding of the picture is typically performed on a block level where e.g. inter frame prediction or intra frame prediction are used to generate a prediction block, to subtract the prediction block from the current block (block currently processed/to be processed) to obtain a residual block, which is further transformed and quantized to reduce the amount of data to be transmitted (compression) whereas at the decoder side the inverse processing is applied to the encoded/compressed block to reconstruct the block for representation.

FIG. 1 is a schematic block diagram illustrating an example coding system 10, e.g. a video coding system 10 that may utilize techniques of this present application (present disclosure). Encoder 20 (e.g. Video encoder 20) and decoder 30 (e.g. video decoder 30) of video coding system 10 represent examples of devices that may be configured to perform techniques in accordance with various examples described in the present application. As shown in FIG. 1, the coding system 10 comprises a source device 12 configured to provide encoded data 13, e.g. an encoded picture 13, e.g. to a destination device 14 for decoding the encoded data 13.

The source device 12 comprises an encoder 20, and may additionally, i.e. optionally, comprise a picture source 16, a pre-processing unit 18, e.g. a picture pre-processing unit 18, and a communication interface or communication unit 22.

The picture source 16 may comprise or be any kind of picture capturing device, for example for capturing a real-world picture, and/or any kind of a picture or comment (for screen content coding, some texts on the screen is also considered a part of a picture or image to be encoded) generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 16(e.g. video source 16) may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 17 may be the same interface as or a part of the communication interface 22.

In distinction to the pre-processing unit 18 and the processing performed by the pre-processing unit 18, the picture or picture data 17 (e.g. video data 16) may also be referred to as raw picture or raw picture data 17.

Pre-processing unit 18 is configured to receive the (raw) picture data 17 and to perform pre-processing on the picture data 17 to obtain a pre-processed picture 19 or pre-processed picture data 19. Pre-processing performed by the pre-processing unit 18 may, e.g., comprise trimming, color format conversion (e.g. from RGB to YCbCr), color correction, or de-noising. It can be understood that the pre-processing unit 18 may be optional component.

The encoder 20 (e.g. video encoder 20) is configured to receive the pre-processed picture data 19 and provide encoded picture data 21 (further details will be described below, e.g., based on FIG. 2).

Communication interface 22 of the source device 12 may be configured to receive the encoded picture data 21 and to transmit it to another device, e.g. the destination device 14 or any other device, for storage or direct reconstruction, or to process the encoded picture data 21 for respectively before storing the encoded data 13 and/or transmitting the encoded data 13 to another device, e.g. the destination device 14 or any other device for decoding or storing.

The destination device 14 comprises a decoder 30 (e.g. a video decoder 30), and may additionally, i.e. optionally, comprise a communication interface or communication unit 28, a post-processing unit 32 and a display device 34.

The communication interface 28 of the destination device 14 is configured receive the encoded picture data 21 or the encoded data 13, e.g. directly from the source device 12 or from any other source, e.g. a storage device, e.g. an encoded picture data storage device.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, for transmission over a communication link or communication network.

The communication interface 28, forming the counterpart of the communication interface 22, may be, e.g., configured to de-package the encoded data 13 to obtain the encoded picture data 21.

Both, communication interface 22 and communication interface 28 may be configured as unidirectional communication interfaces as indicated by the arrow for the encoded picture data 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1 depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1 may vary depending on the actual device and application.

The encoder 20 (e.g. a video encoder 20) and the decoder 30 (e.g. a video decoder 30) each may be implemented as any one of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any one of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Figure 2:
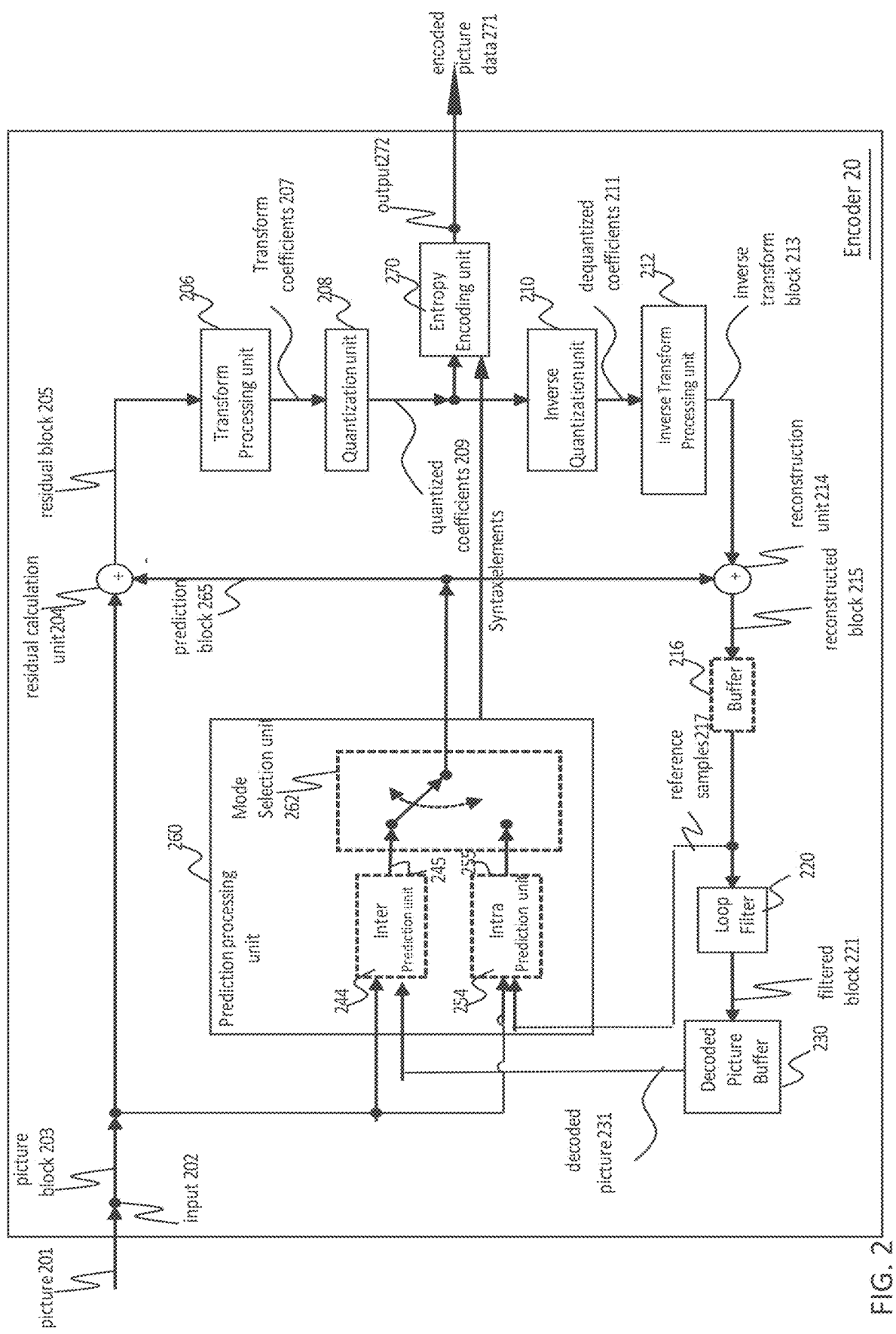
FIG. 2 is a block diagram showing an example of a video encoder configured to implement embodiments of the invention.

FIG. 2 shows a schematic/conceptual block diagram of an example video encoder 20 that is configured to implement the techniques of the present application. In the example of FIG. 2, the video encoder 20 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer (DPB) 230, a prediction processing unit 260 and an entropy encoding unit 270. The prediction processing unit 260 may include an inter prediction unit 244, an intra prediction unit 254 and a mode selection unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
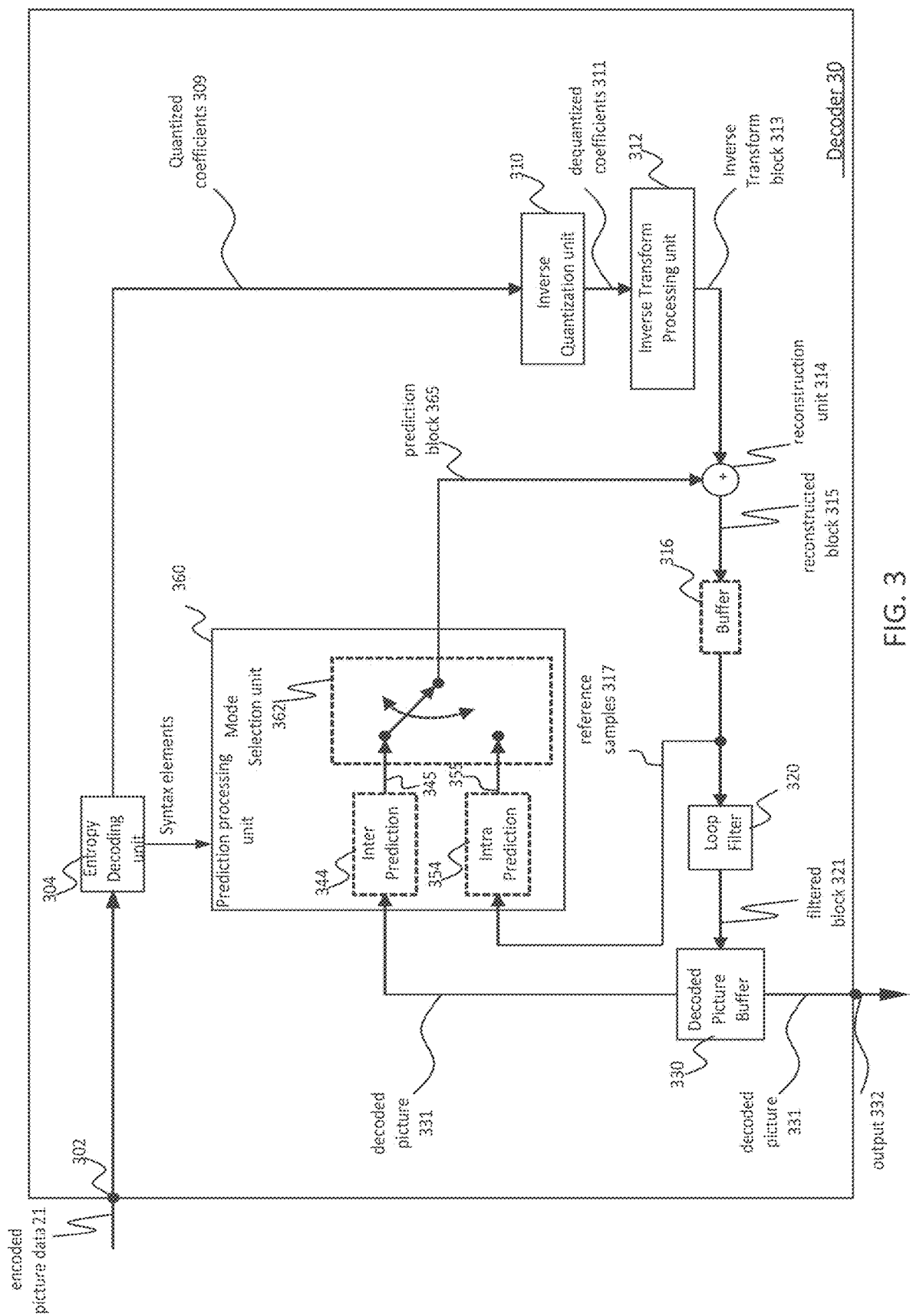
FIG. 3 is a block diagram showing an example structure of a video decoder configured to implement embodiments of the invention.

For example, the residual calculation unit 204, the transform processing unit 206, the quantization unit 208, the prediction processing unit 260 and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, prediction processing unit 260 form a backward signal path of the encoder, wherein the backward signal path of the encoder corresponds to the signal path of the decoder (see decoder 30 in FIG. 3).

The encoder 20 is configured to receive, e.g. by input 202, a picture 201 or a block 203 of the picture 201, e.g. picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g. previously encoded and/or decoded pictures of the same video sequence, i.e. the video sequence which also comprises the current picture).

The prediction processing unit 260, also referred to as block prediction processing unit 260, is configured to receive or obtain the block 203 (current block 203 of the current picture 201) and reconstructed picture data, e.g. reference samples of the same (current) picture from buffer 216 and/or reference picture data 231 from one or a plurality of previously decoded pictures from decoded picture buffer 230, and to process such data for prediction, i.e. to provide a prediction block 265, which may be an inter-predicted block 245 or an intra-predicted block 255.

Mode selection unit 262 may be configured to select a prediction mode (e.g. an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the partitioning and the prediction mode (e.g. from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e. select the prediction mode which provides a minimum rate distortion optimization or which associated rate distortion at least a fulfills a prediction mode selection criterion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

The intra prediction unit 254 is further configured to determine based on intra prediction parameter, e.g. the selected intra prediction mode, the intra prediction block 255. In any case, after selecting an intra prediction mode for a block, the intra prediction unit 254 is also configured to provide intra prediction parameter, i.e. information indicative of the selected intra prediction mode for the block to the entropy encoding unit 270. In one example, the intra prediction unit 254 may be configured to perform any combination of the intra prediction techniques described later.

FIG. 3 an exemplary video decoder 30 that is configured to implement the techniques of this present application. The video decoder 30 configured to receive encoded picture data (e.g. encoded bitstream) 21, e.g. encoded by encoder 100, to obtain a decoded picture 131. During the decoding process, video decoder 30 receives video data, e.g. an encoded video bitstream that represents picture blocks of an encoded video slice and associated syntax elements, from video encoder 100.

In the example of FIG. 3, the decoder 30 comprises an entropy decoding unit 304, an inverse quantization unit 310, an inverse transform processing unit 312, a reconstruction unit 314(e.g. a summer 314), a buffer 316, a loop filter 320, a decoded picture buffer 330 and a prediction processing unit 360. The prediction processing unit 360 may include an inter prediction unit 344, an intra prediction unit 354, and a mode selection unit 362. Video decoder 30 may, in some examples, perform a decoding pass generally reciprocal to the encoding pass described with respect to video encoder 100 from FIG. 2.

The entropy decoding unit 304 is configured to perform entropy decoding to the encoded picture data 21 to obtain, e.g., quantized coefficients 309 and/or decoded coding parameters (not shown in FIG. 3), e.g. (decoded) any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. Video decoder 30 may receive the syntax elements at the video slice level and/or the video block level.

The inverse quantization unit 310 may be identical in function to the inverse quantization unit 110, the inverse transform processing unit 312 may be identical in function to the inverse transform processing unit 112, the reconstruction unit 314 may be identical in function reconstruction unit 114, the buffer 316 may be identical in function to the buffer 116, the loop filter 320 may be identical in function to the loop filter 120, and the decoded picture buffer 330 may be identical in function to the decoded picture buffer 130.

The prediction processing unit 360 may comprise an inter prediction unit 344 and an intra prediction unit 354, wherein the inter prediction unit 344 may resemble the inter prediction unit 144 in function, and the intra prediction unit 354 may resemble the intra prediction unit 154 in function. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g. from the entropy decoding unit 304.

When the video slice is coded as an intra coded (I) slice, intra prediction unit 354 of prediction processing unit 360 is configured to generate prediction block 365 for a picture block of the current video slice based on a signaled intra prediction mode and data from previously decoded blocks of the current frame or picture. When the video frame is coded as an inter coded (i.e., B, or P) slice, inter prediction unit 344(e.g. motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients provided in the bitstream and decoded by entropy decoding unit 304. The inverse quantization process may include use of a quantization parameter calculated by video encoder 100 for each video block in the video slice to determine a degree of quantization and, likewise, a degree of inverse quantization that should be applied.

Inverse transform processing unit 312 is configured to apply an inverse transform, e.g., an inverse DCT, an inverse integer transform, or a conceptually similar inverse transform process, to the transform coefficients in order to produce residual blocks in the pixel domain.

The reconstruction unit 314(e.g. Summer 314) is configured to add the inverse transform block 313(i.e. reconstructed residual block 313) to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. In one example, the loop filter unit 320 may be configured to perform any combination of the filtering techniques described later. The loop filter unit 320 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 320 is shown in FIG. 3 as being an in loop filter, in other configurations, the loop filter unit 320 may be implemented as a post loop filter.

The decoded video blocks 321 in a given frame or picture are then stored in decoded picture buffer 330, which stores reference pictures used for subsequent motion compensation.

The decoder 30 is configured to output the decoded picture 331, e.g. via output 332, for presentation or viewing to a user.

Other variations of the video decoder 30 can be used to decode the compressed bitstream. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

Figure 4:
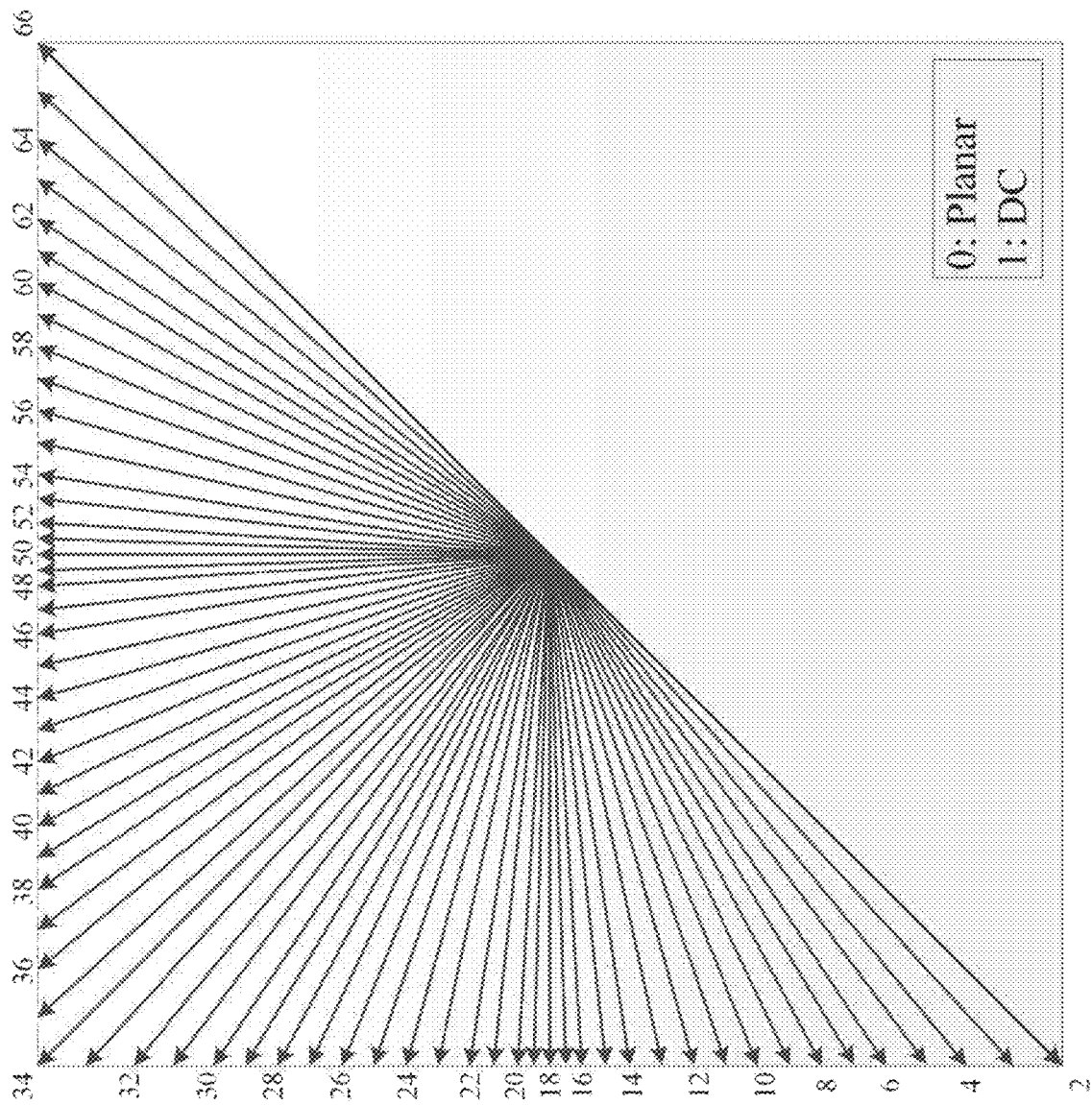
FIG. 4 shows an example of 67 intra prediction modes.

FIG. 4 shows an example of 67 intra prediction modes, e.g., as proposed for VVC, the plurality of intra prediction modes of 67 intra prediction modes comprising: planar mode (index 0), dc mode (index 1), and angular modes with indices 2 to 66, wherein the left bottom angular mode in FIG. 4 refers to index 2 and the numbering of the indices being incremented until index 66 being the top right most angular mode of FIG. 4.

As shown in FIG. 4, the latest version of JEM has some modes corresponding to skew intra prediction directions. For any one of these modes, to predict samples within a block, interpolation of a set of neighboring reference samples should be performed if a corresponding position within a block side is fractional. Linear interpolation between two adjacent reference samples are used in HEVC and VVC. Sophisticated 4-tap interpolation filters are used in JEM. Filter coefficients are selected to be either Gaussian or Cubic depending on a width value of a block or on a height value of a block. The decision whether to use width or height is harmonized with the decision about the main reference side selection. When a value of an intra prediction mode is greater than or equal to a value of a diagonal mode, a top side of reference samples is selected to be the main reference side, and the width value is selected to determine the interpolation filter in use. When a value of an intra prediction mode is smaller than a value of a diagonal mode, a main side reference is selected from the left side of the block and a height value is used to control the filter selection process. For example, if the selected side length is smaller than or equal to 8 samples, a 4-tap Cubic filter is applied. If the selected side length is greater than 8 samples, a 4-tap Gaussian filter is used as the interpolation filter.

The filter coefficients used in JEM are given in Table 1. A predicted sample is calculated by convoluting with coefficients selected from Table 1, according to subpixel offset and filter type as follows:

$$s(x) = (\Sigma_{i=0}^{i<4}(\text{ref}_{i+x} \cdot c_i) + 128) \gg 8$$

In this equation, "$\gg$" indicates a bitwise shift-right operation.

If a Cubic filter is selected, a predicted sample (sample value) is further clipped to the allowed range of values that is either defined in a sequence parameter set (SPS), or derived from the bit depth of the selected component.

TABLE 1

Intra prediction interpolation filters

| Subpixel offset | Cubic filter | | | | Gauss filter | | | |
|---|---|---|---|---|---|---|---|---|
| | $c_0$ | $c_1$ | $c_2$ | $c_3$ | $c_0$ | $c_1$ | $c_2$ | $c_3$ |
| 0 (integer) | 0 | 256 | 0 | 0 | 47 | 161 | 47 | 1 |
| 1 | −3 | 252 | 8 | −1 | 43 | 161 | 51 | 1 |
| 2 | −5 | 247 | 17 | −3 | 40 | 160 | 54 | 2 |
| 3 | −7 | 242 | 25 | −4 | 37 | 159 | 58 | 2 |
| 4 | −9 | 236 | 34 | −5 | 34 | 158 | 62 | 2 |
| 5 | −10 | 230 | 43 | −7 | 31 | 156 | 67 | 2 |
| 6 | −12 | 224 | 52 | −8 | 28 | 154 | 71 | 3 |
| 7 | −13 | 217 | 61 | −9 | 26 | 151 | 76 | 3 |
| 8 | −14 | 210 | 70 | −10 | 23 | 149 | 80 | 4 |
| 9 | −15 | 203 | 79 | −11 | 21 | 146 | 85 | 4 |
| 10 | −16 | 195 | 89 | −12 | 19 | 142 | 90 | 5 |
| 11 | −16 | 187 | 98 | −13 | 17 | 139 | 94 | 6 |
| 12 | −16 | 179 | 107 | −14 | 16 | 135 | 99 | 6 |
| 13 | −16 | 170 | 116 | −14 | 14 | 131 | 104 | 7 |
| 14 | −17 | 162 | 126 | −15 | 13 | 127 | 108 | 8 |
| 15 | −16 | 153 | 135 | −16 | 11 | 123 | 113 | 9 |
| 16 (half-pel) | −16 | 144 | 144 | −16 | 10 | 118 | 118 | 10 |
| 17 | −16 | 135 | 153 | −16 | 9 | 113 | 123 | 11 |
| 18 | −15 | 126 | 162 | −17 | 8 | 108 | 127 | 13 |
| 19 | −14 | 116 | 170 | −16 | 7 | 104 | 131 | 14 |
| 20 | −14 | 107 | 179 | −16 | 6 | 99 | 135 | 16 |
| 21 | −13 | 98 | 187 | −16 | 6 | 94 | 139 | 17 |
| 22 | −12 | 89 | 195 | −16 | 5 | 90 | 142 | 19 |
| 23 | −11 | 79 | 203 | −15 | 4 | 85 | 146 | 21 |
| 24 | −10 | 70 | 210 | −14 | 4 | 80 | 149 | 23 |
| 25 | −9 | 61 | 217 | −13 | 3 | 76 | 151 | 26 |
| 26 | −8 | 52 | 224 | −12 | 3 | 71 | 154 | 28 |
| 27 | −7 | 43 | 230 | −10 | 2 | 67 | 156 | 31 |
| 28 | −5 | 34 | 236 | −9 | 2 | 62 | 158 | 34 |
| 29 | −4 | 25 | 242 | −7 | 2 | 58 | 159 | 37 |
| 30 | −3 | 17 | 247 | −5 | 2 | 54 | 160 | 40 |
| 31 | −1 | 8 | 252 | −3 | 1 | 51 | 161 | 43 |

A motion compensation process also utilizes filtering to predict sample values when displacements of the pixels of the reference block are fractional. In JEM, 8-tap filtering is used for the luminance component and 4-tap length filtering is used for the chrominance component. The motion interpolation filter is firstly applied horizontally, and the output of the horizontal filtering is further filtered vertically. Coefficients of a 4-tap chrominance filter are Oven in Table 2.

TABLE 2

Chrominance motion interpolation filter coefficients

| Subpixel offset | $c_0$ | $c_1$ | $c_2$ | $c_3$ |
|---|---|---|---|---|
| 0 (integer) | 0 | 64 | 0 | 0 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 (half-pel) | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

Figure 5:
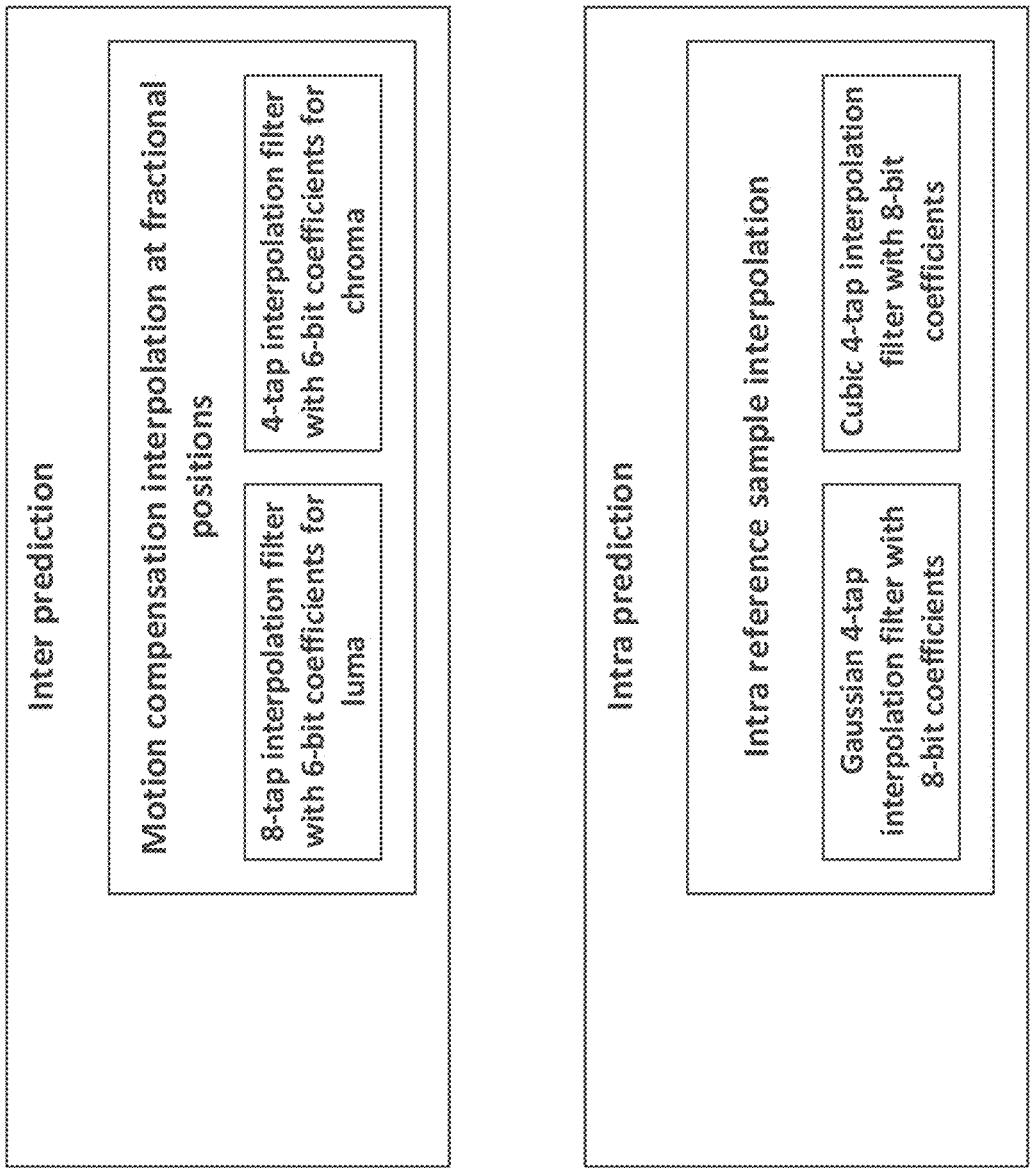
FIG. 5 shows an example of interpolation filters used in inter prediction and intra prediction.
Figure 6:
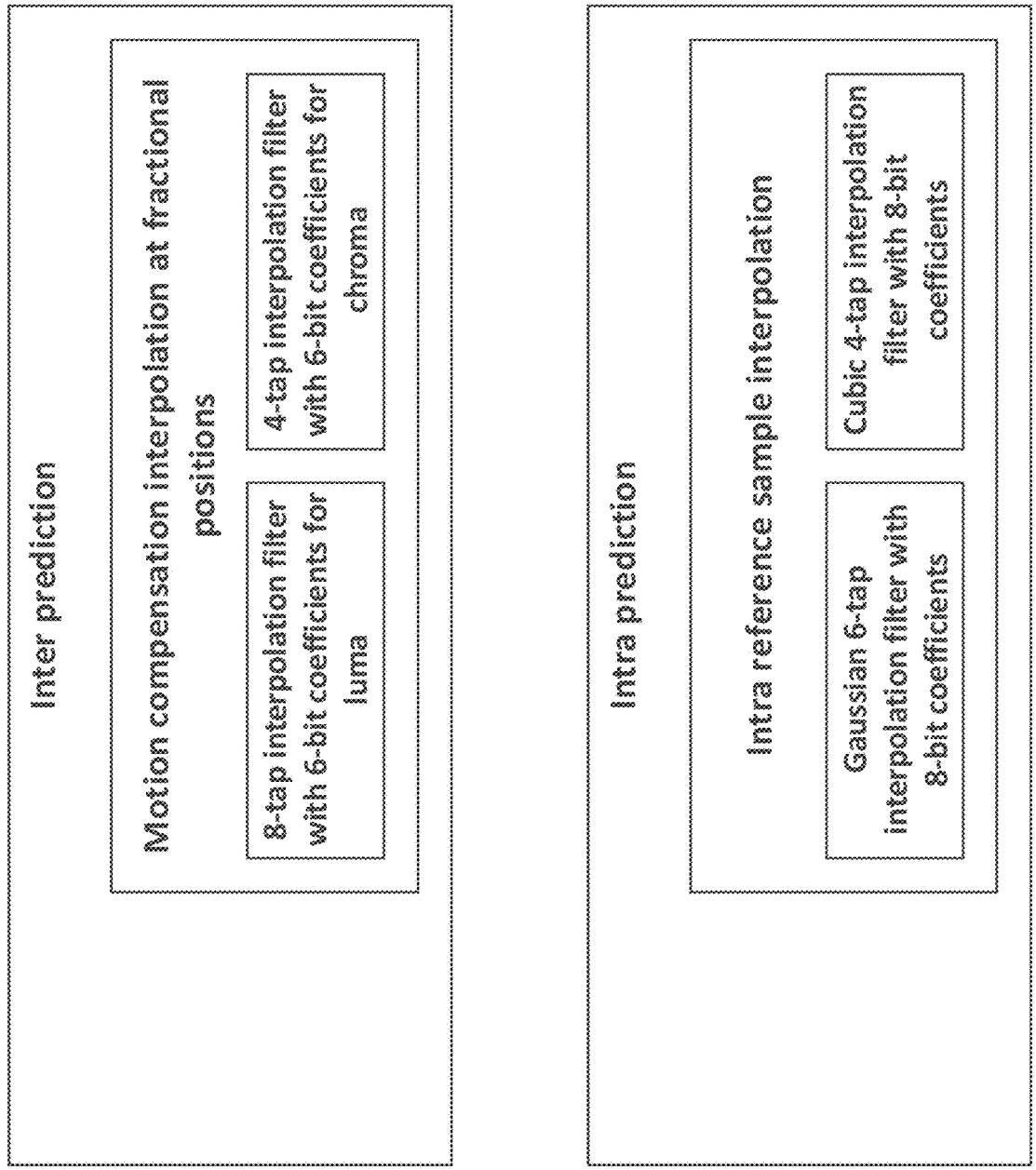
FIG. 6 shows another example of interpolation filters used in inter prediction and intra prediction.
Figure 7:
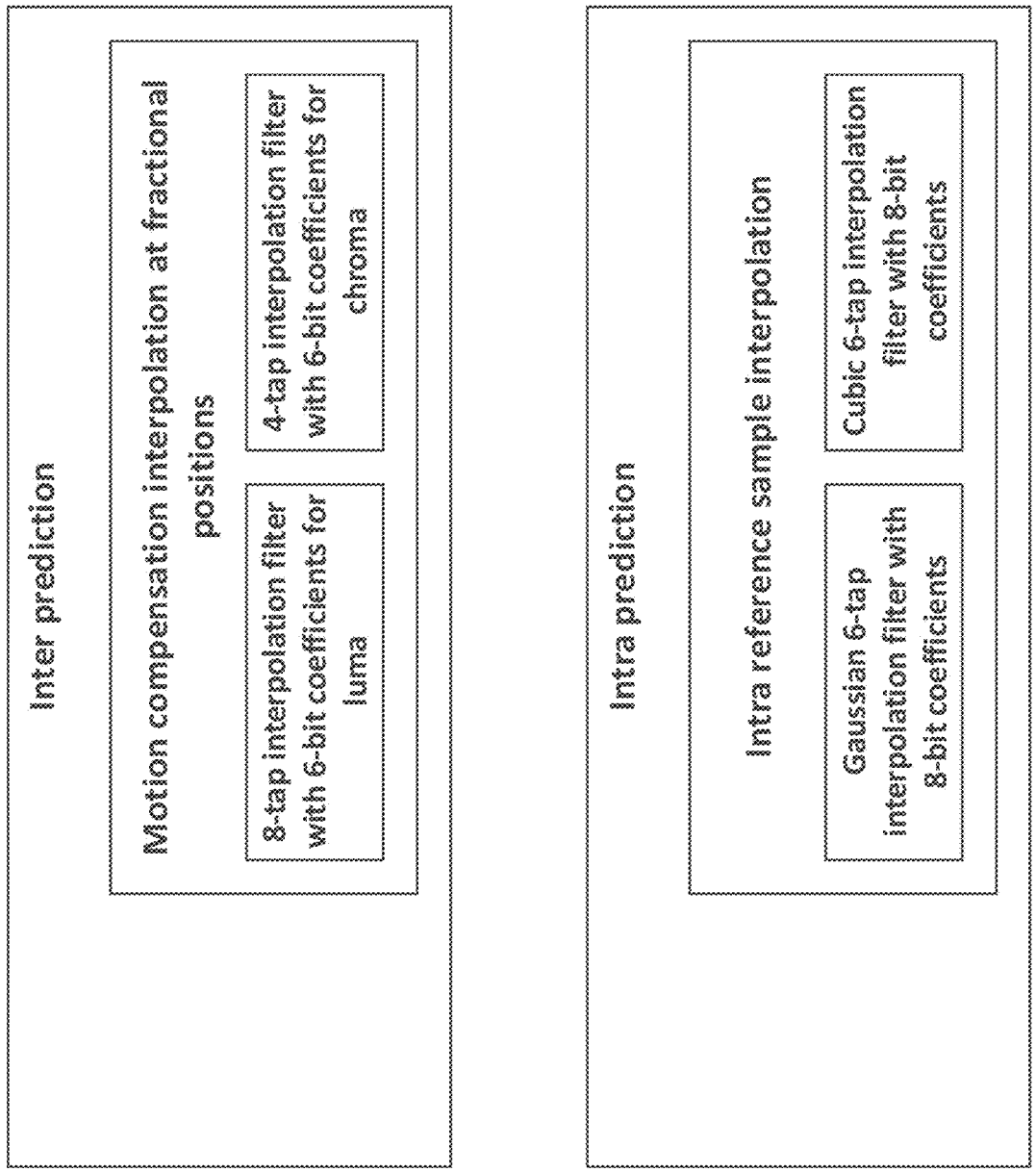
FIG. 7 shows yet another example of interpolation filters used in inter prediction and intra prediction.

There are also many video coding solutions that use different interpolation filters for intra- and inter-prediction. Particularly, FIGS. 5-7 show different examples of interpolation filters. FIG. 5 shows an example of interpolation filters used in JEM. FIG. 6 shows another example of interpolation filters proposed for Core-experiment CE 3-3.1.3, which is disclosed in ITU-JVET K1023. FIG. 7 shows another example of interpolation filters proposed in ITU-JVET K0064.

Disclosure presented herein reuses the look-up tables and/or hardware modules of a chroma motion compensation sub-pel filter, for interpolating pixel values within an intra predictor if they fall into fractional positions between reference samples. Since the same hardware is intended to be used for both inter-prediction and intra-prediction, the precision of filter coefficients should be consistent, i.e. the number of bits to represent filter coefficients for intra reference sample interpolation should be aligned with the coefficient precision of motion sub-pel motion compensation interpolation filtering.

Figure 8:
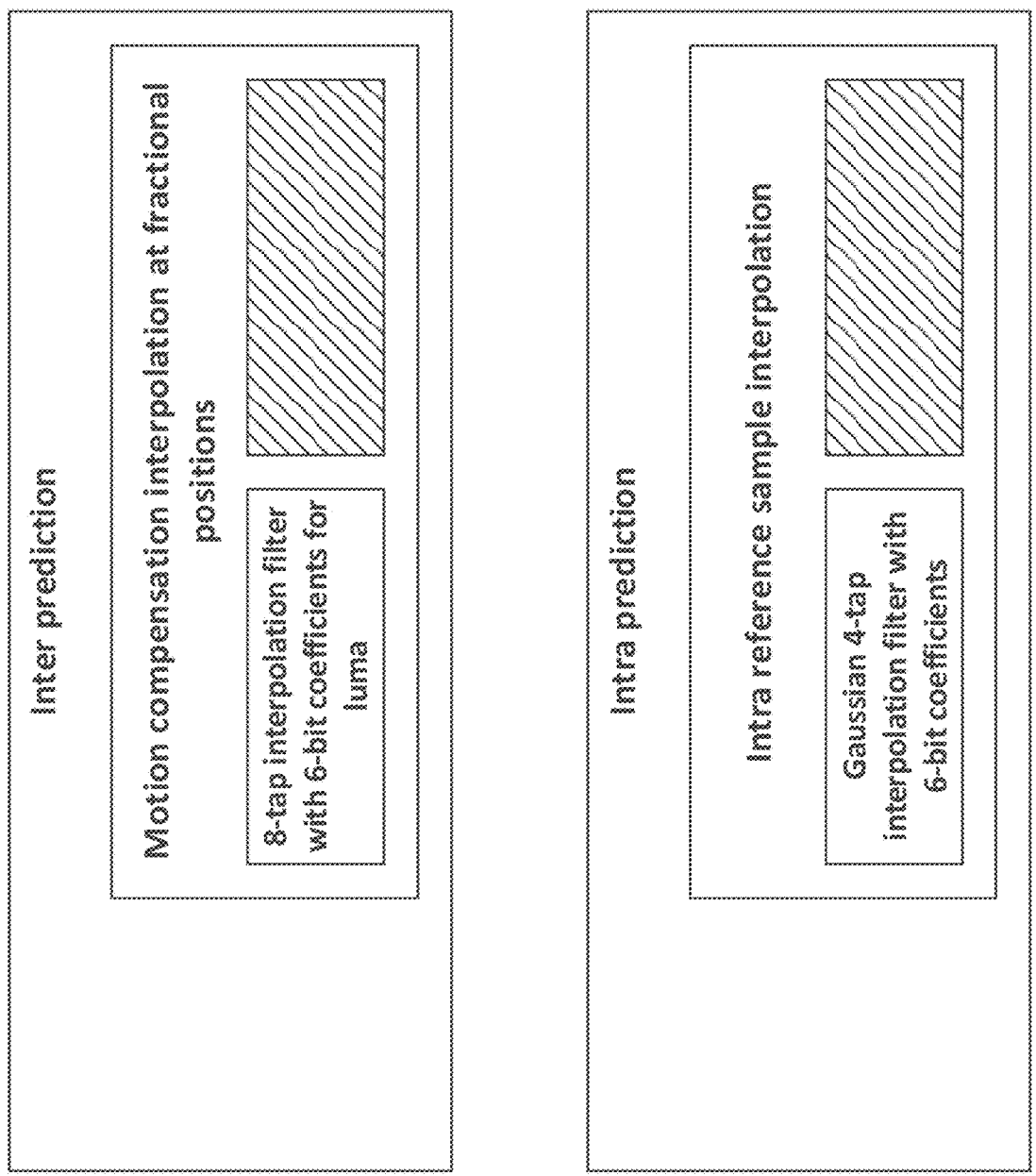
FIG. 8 shows an example of reusing a 4-tap interpolation filter for inter prediction and intra prediction.

FIG. 8 illustrates an example of the present disclosure. The dashed "4-tap interpolation filter with 6-bit coefficients for chroma" (further referred to as "Unified intra/inter filter") may be used for both processes: interpolation of intra- and inter-predicted samples.

Figure 9:
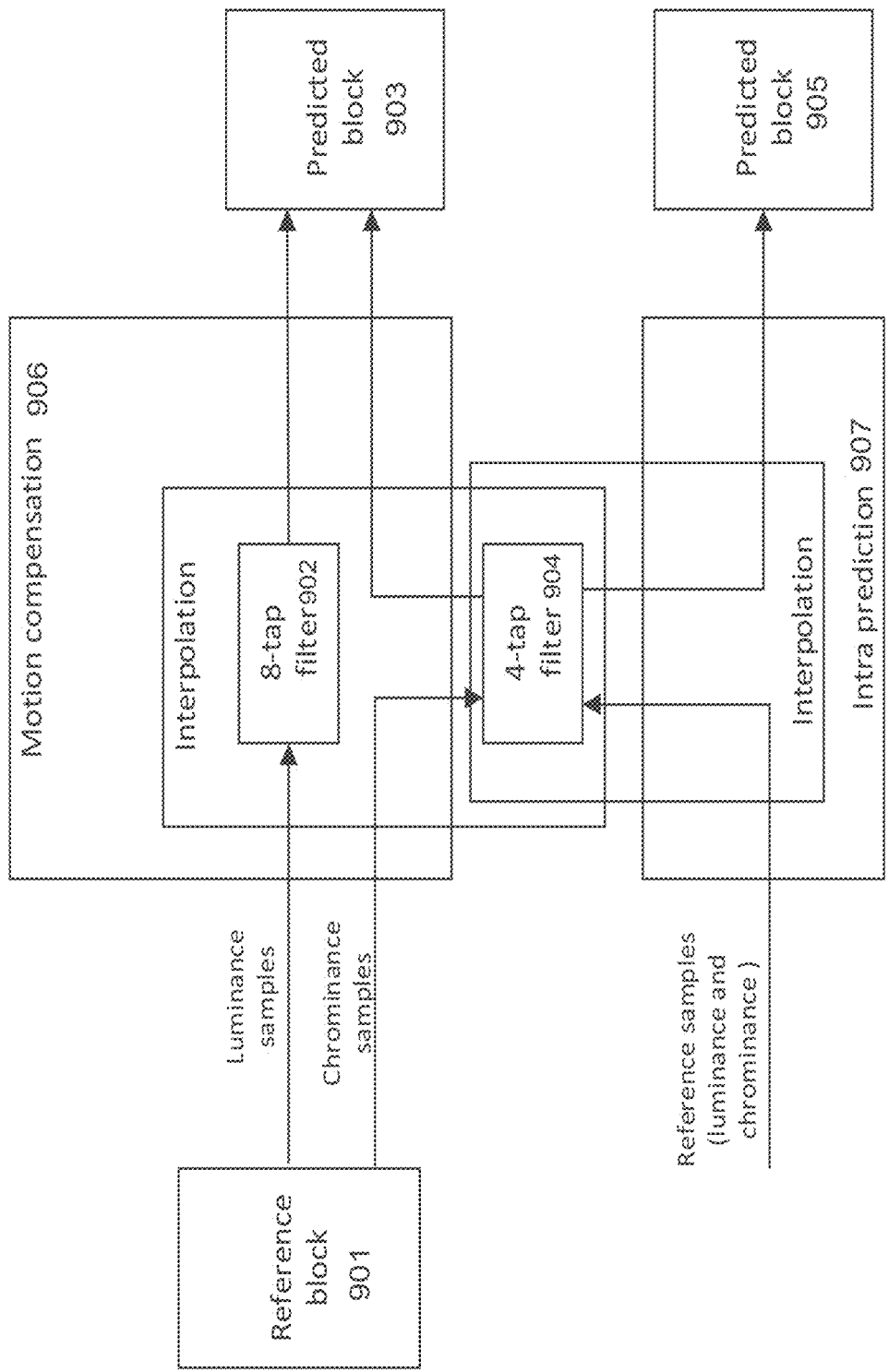
FIG. 9 shows another example of reusing a 4-tap interpolation filter for inter prediction and intra prediction.

An example that utilizes this design is shown in FIG. 9. In this implementation, a filtering module is being implemented as a separate unit that is being engaged in both: prediction of chrominance samples in motion compensation, and predicting luminance and chrominance samples when performing intra-prediction. In this implementation, the hardware filtering part is used in both intra- and inter-prediction processes.

Figure 10:
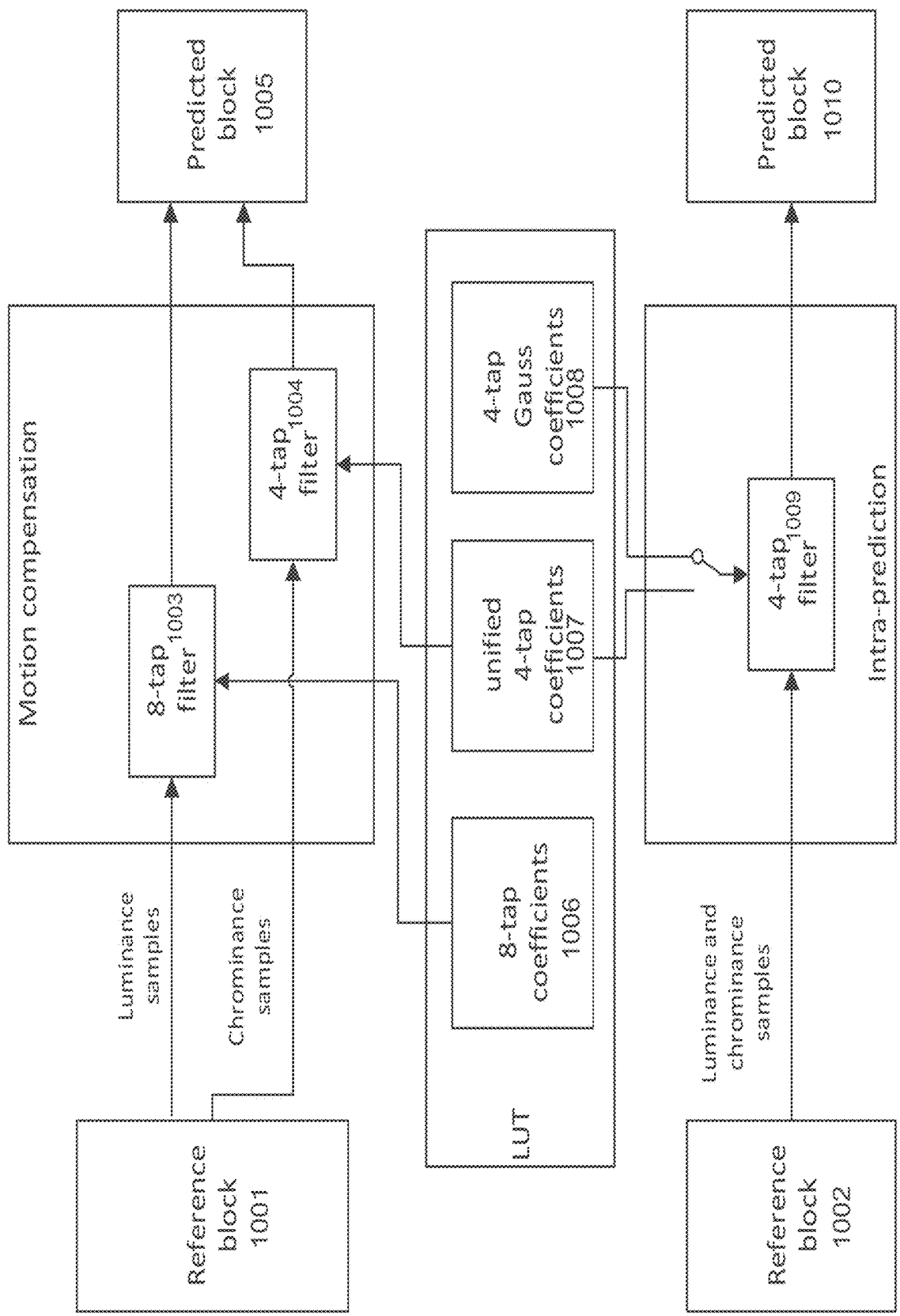
FIG. 10 shows an example of reusing 4-tap coefficients for inter prediction and intra prediction.

FIG. 10 shows another example when only LUTs of filter coefficients are reused. FIG. 10 is an exemplary implementation of proposed application based on reusing LUT coefficients. In this implementation, hardware filtering modules load coefficients from LUTs that are stored in ROM. A switch shown for the intra prediction process determines the filter type to be used, depending on the length of the main side selected for intra prediction process.

A practical implementation of the proposed schedule may use the following coefficients (see Table 3).

TABLE 3

Intra-and Inter-interpolating filters

| Sub pixel offset | Unified intra/inter filter | | | | Gauss filter | | | |
|---|---|---|---|---|---|---|---|---|
| | $c_0$ | $c_1$ | $c_2$ | $c_3$ | $c_0$ | $c_1$ | $c_2$ | $c_3$ |
| 0 (integer) | 0 | 64 | 0 | 0 | 12 | 40 | 12 | 0 |
| 1 | −1 | 63 | 2 | 0 | 11 | 40 | 13 | 0 |
| 2 | −2 | 62 | 4 | 0 | 10 | 40 | 14 | 0 |
| 3 | −2 | 60 | 7 | −1 | 9 | 40 | 15 | 0 |
| 4 | −2 | 58 | 10 | −2 | 8 | 40 | 16 | 0 |
| 5 | −3 | 57 | 12 | −2 | 7 | 40 | 17 | 0 |
| 6 | −4 | 56 | 14 | −2 | 7 | 39 | 17 | 1 |
| 7 | −4 | 55 | 15 | −2 | 7 | 38 | 18 | 1 |
| 8 | −4 | 54 | 16 | −2 | 6 | 37 | 20 | 1 |
| 9 | −5 | 53 | 18 | −2 | 5 | 37 | 21 | 1 |
| 10 | −6 | 52 | 20 | −2 | 4 | 36 | 23 | 1 |
| 11 | −6 | 49 | 24 | −3 | 4 | 34 | 24 | 2 |
| 12 | −6 | 46 | 28 | −4 | 4 | 34 | 24 | 2 |
| 13 | −5 | 44 | 29 | −4 | 4 | 33 | 25 | 2 |
| 14 | −4 | 42 | 30 | −4 | 3 | 32 | 27 | 2 |
| 15 | −4 | 39 | 33 | −4 | 3 | 31 | 28 | 2 |
| 16 (half-pel) | −4 | 36 | 36 | −4 | 3 | 29 | 29 | 3 |
| 17 | −4 | 33 | 39 | −4 | 2 | 28 | 31 | 3 |
| 18 | −4 | 30 | 42 | −4 | 2 | 27 | 32 | 3 |
| 19 | −4 | 29 | 44 | −5 | 2 | 25 | 33 | 4 |
| 20 | −4 | 28 | 46 | −6 | 2 | 24 | 34 | 4 |
| 21 | −3 | 24 | 49 | −6 | 2 | 24 | 34 | 4 |
| 22 | −2 | 20 | 52 | −6 | 1 | 23 | 36 | 4 |
| 23 | −2 | 18 | 53 | −5 | 1 | 21 | 37 | 5 |
| 24 | −2 | 16 | 54 | −4 | 1 | 20 | 37 | 6 |
| 25 | −2 | 15 | 55 | −4 | 1 | 18 | 38 | 7 |
| 26 | −2 | 14 | 56 | −4 | 1 | 17 | 39 | 7 |
| 27 | −2 | 12 | 57 | −3 | 0 | 17 | 40 | 7 |
| 28 | −2 | 10 | 58 | −2 | 0 | 16 | 40 | 8 |
| 29 | −1 | 7 | 60 | −2 | 0 | 15 | 40 | 9 |
| 30 | 0 | 4 | 62 | −2 | 0 | 14 | 40 | 10 |
| 31 | 0 | 2 | 63 | −1 | 0 | 13 | 40 | 11 |

An intra-predicted sample is calculated by convoluting with coefficients selected from Table 3 according to a subpixel offset and a filter type as follows:

$$s(x) = \left(\sum_{i=0}^{i<4}(ref_{i+x} \cdot c_i) + 32\right) \gg 6$$

In this equation, "»" indicates a bitwise shift-right operation.

If "Unified intra/inter filter" filter is selected, a predicted sample is further clipped to the allowed range of values, that is either defined in SPS or derived from the bit depth of the selected component.

For intra reference sample interpolation and sub-pel motion compensation interpolation, the same filter can be used to reuse hardware modules and to reduce the total size of required memory, The precision of filter coefficients used for intra reference sample interpolation in addition to the reused filter should be aligned with the precision of coefficients of the above-mentioned reused filter.

Luma processing in motion compensation does not necessarily use 8-tap filtering but may also operate on 4-tap filtering. In this case the 4-tap filter could be selected to be unified.

The disclosure presented herein may be applied in different parts of an intra-prediction process that may involve interpolation. Particularly, when extending main reference samples, side reference samples may also be filtered using unified interpolation filter (see sections 2.1, 3.1, 4.1 and 5 of JVET-K0211 for details).

Intra block copy operations also involve an interpolation step that may use the disclosure presented herein (see [Xiaozhong Xu, Shan Liu, Tzu-Der Chuang, Yu-Wen Huang, Shawmin Lei, Krishnakanth Rapaka, Chao Pang, Vadim Seregin, Ye-Kui Wang, Marta Karczewicz: Intra Block Copy in HEVC Screen Content Coding Extensions. IEEE J. Emerg. Sel. Topics Circuits Syst. 6(4): 409-419 (2016)] for Intra block copy description).

According to certain aspects of the disclosure, a method for aspect-ratio dependent filtering for intra-prediction includes: selecting an interpolation filter for a block to be predicted depending on an aspect ratio of the block.

In an example, a selection of the interpolation filter depends on a direction for thresholding an intra prediction mode of the block to be predicted.

In an example, the direction corresponds to an angle of a main diagonal of the block to be predicted.

In an example, an angle of the direction is calculated as:

$$\alpha_T = \arctan\left(\frac{H}{W}\right),$$

where W,H are width and height of the block to be predicted, respectively.

In an example, an aspect ratio $R_A$ is determined, e.g. corresponding to the following equation $R_A = \log(W) - \log(H),$ where W,H are width and height of the block to be predicted, respectively.

In an example, the angle of a main diagonal of the block to be predicted is determined based on the aspect ratio.

In an example, a threshold of an intra prediction mode of the block is determined based on the angle of the main diagonal of the block to be predicted.

In an example, a selection of the interpolation filter depends on to which side used reference samples belong to.

In an example, a straight line with an angle corresponding to an intra direction divides the block into two areas.

In an example, the reference samples belonging to different areas are predicted using different interpolation filters.

In an example, the filter includes a cubic interpolation filter or a gauss interpolation filter.

In one implementation form of the present disclosure, a frame is same as a picture.

In one implementation form of the present disclosure, a value corresponding to the VER_IDX is 50; a value corresponding to the HOR_IDX is 18; a value corresponding to the VDIA_IDX is 66, and this value may be the largest value in the values corresponding to the angular modes; the value 2 corresponding to the intra mode 2 may be the smallest value of the values corresponding to the angular modes; a value corresponding to the DIA_IDX is 34.

Aspects of the present disclosure may target an improvement in the intra mode signaling scheme. In the present disclosure, a video decoding method and a video decoder are proposed.

FIG. 4 shows an example of 67 intra prediction modes, e.g., as proposed for VVC, the plurality of intra prediction modes of 67 intra prediction modes comprises: a planar mode (index 0), a dc mode (index 1), and angular modes with indices 2 to 66, wherein the left bottom angular mode in FIG. 4 refers to index 2 and the numbering of the indices being incremented until index 66 being the top right most angular mode of FIG. 4.

In another aspect of the present disclosure, a decoder comprising processing circuitry is disclosed, which is configured for carrying out the above decoding methods.

In another aspect of the present disclosure, a computer program product is disclosed, which comprises a program code for performing the above decoding methods.

In another aspect of the present disclosure, a decoder for decoding video data is disclosed, the decoder comprising: one or more processors; and a non-transitory computer-readable storage medium coupled to the processors and storing programming for execution by the processors, wherein the programming, when executed by the processors, configures the decoder to carry out the above decoding methods.

The processing circuitry can be implemented in hardware, or in a combination of hardware and software, for example by a software programmable processor or the like.

The processing circuitry can be implemented in hardware, or in a combination of hardware and software, for example by a software programmable processor or the like.

Figure 11:
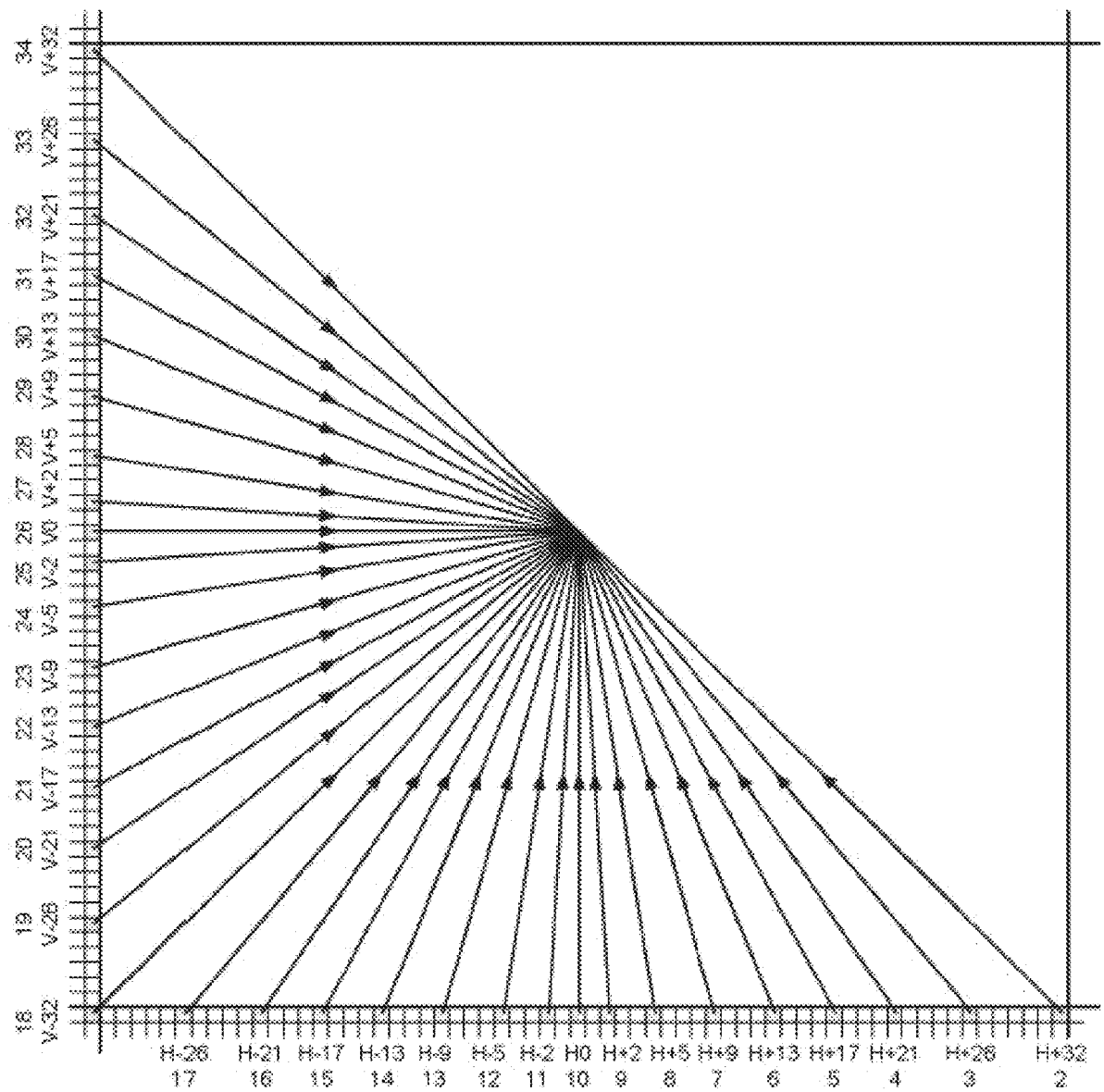
FIG. 11 shows an example of 35 intra prediction modes.

FIG. 11 illustrates a schematic diagram of a plurality of intra prediction modes used in the HEVC UIP scheme, which may be used by another examples. For luminance blocks, the intra prediction modes may comprise up to 36 intra prediction modes, which may include three non-directional modes and 33 directional modes. The non-directional modes may comprise a planar prediction mode, a mean (DC) prediction mode, and a chroma from luma (LM) prediction mode. The planar prediction mode may perform predictions by assuming a block amplitude surface with a horizontal and vertical slope derived from the boundary of the block. The DC prediction mode may perform predictions by assuming a flat block surface with a value matching the mean value of the block boundary. The LM prediction mode may perform predictions by assuming a chroma value for the block matches the luma value for the block. The directional modes may perform predictions based on adjacent blocks as shown in FIG. 11.

H.264/AVC and HEVC specifies that a low-pass filter could be applied to reference samples prior to being used in an intra prediction process. A decision on whether to use reference sample filter or not is determined by an intra prediction mode and a block size. This mechanism may be referred to as Mode Dependent Intra Smoothing (MDIS). There also exists a plurality of methods related to MDIS. For example, the Adaptive Reference Sample Smoothing (ARSS) method may explicitly (i.e. a flag is included into a bitstream) or implicitly (i.e., for example, data hiding is used to avoid putting a flag into a bitstream to reduce signaling overhead) signal whether the prediction samples are filtered. In this case, the encoder may make the decision on smoothing by testing the Rate-Distortion (RD) cost for all potential intra prediction modes.

As shown in FIG. 4, the latest version of JEM (JEM-7.2) has some modes corresponding to skew intra prediction directions. For any of these modes, to predict samples within a block interpolation of a set of neighboring reference samples should be performed, if a corresponding position within a block side is fractional. HEVC and VVC use linear interpolation between two adjacent reference samples. JEM uses more sophisticated 4-tap interpolation filters. Filter coefficients are selected to be either Gaussian or Cubic ones depending on the width value or on the height value. A decision on whether to use width or height is harmonized with the decision on the main reference side selection: when an intra prediction mode is greater or equal to a diagonal mode, the top side of reference samples is selected to be the main reference side and the width value is selected to determine the interpolation filter in use. Otherwise, the main side reference is selected from the left side of the block and the height controls the filter selection process. For example, if a selected side length is smaller than or equal to 8 samples, Cubic interpolation 4 tap is applied. Otherwise, a 4-tap Gaussian is used as interpolation filter.

Figure 12:
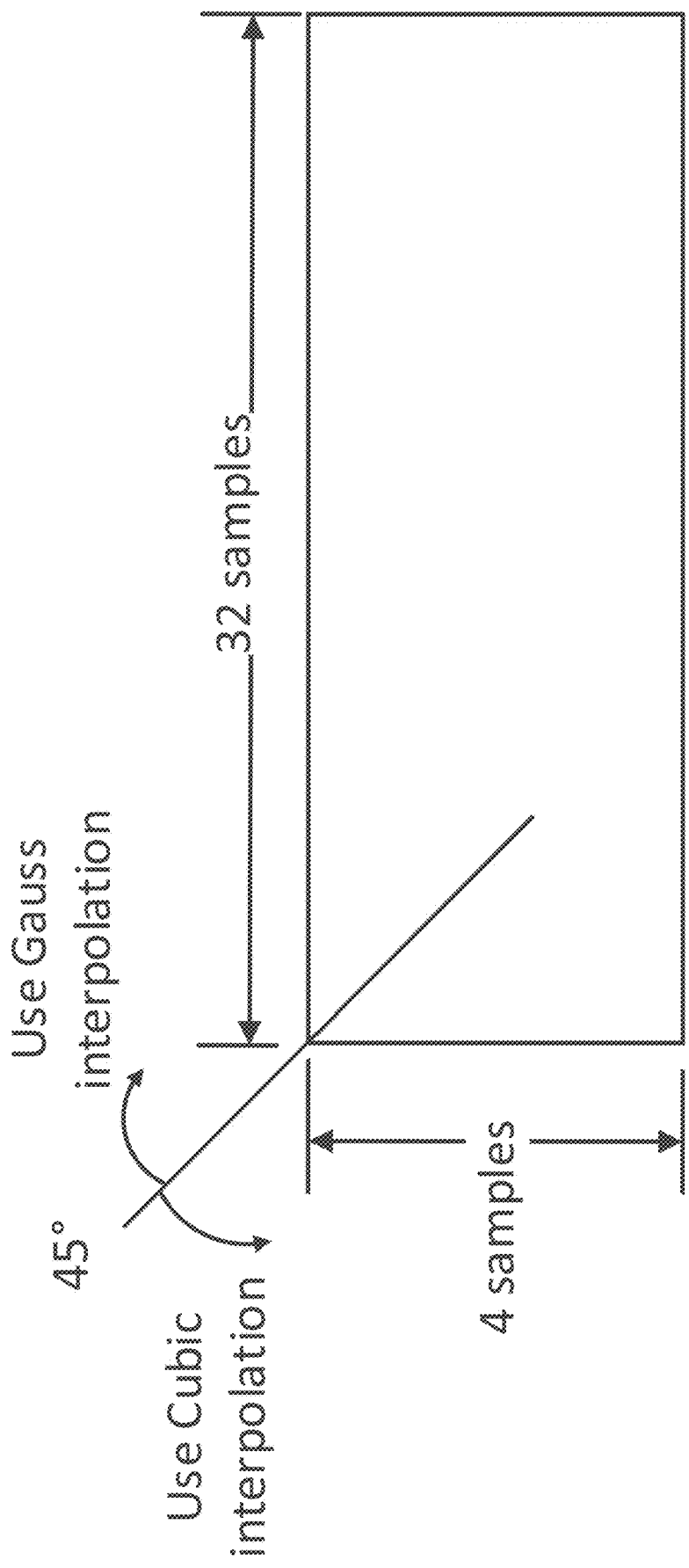
FIG. 12 shows an example of an interpolation filter selection.

An example of an interpolation filter selection for modes smaller and greater than the diagonal one (denoted as 45°) in the case of 32×4 block is shown in FIG. 12.

Figure 13:
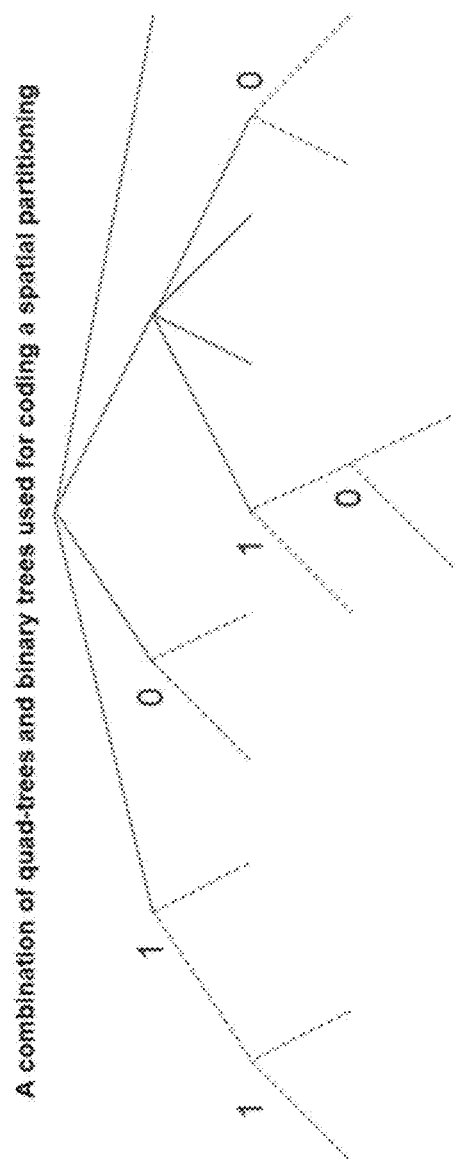
FIG. 13 shows an example of a quad-tree and binary tree partitioning.
Figure 13:
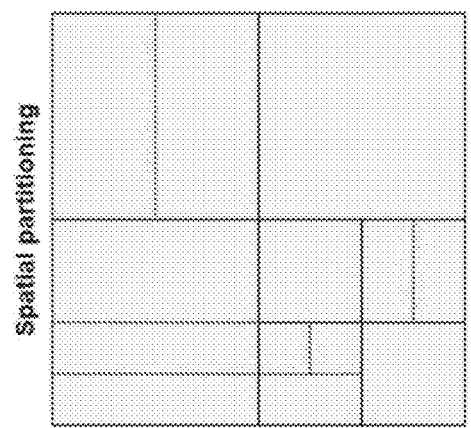

In VVC, a partitioning mechanism based on both quad-tree and binary tree, known as QTBT, is used. As depicted in FIG. 13, QTBT partitioning can provide not just square but rectangular blocks as well. Of course, some signaling overhead and increased computational complexity at the encoder side are the price of the QTBT partitioning, as compared to conventional quad-tree based partitioning as used in the HEVC/H.265 standard. Nevertheless, the QTBT-based partitioning is endowed with better segmentation properties and, hence, demonstrates significantly higher coding efficiency than the conventional quad-tree.

However, VVC in its current state applies the same filter to the both sides of reference samples (left and top ones). No matter whether a block is oriented vertically or horizontally, a reference sample filter will be the same for both reference sample sides.

Figure 14:
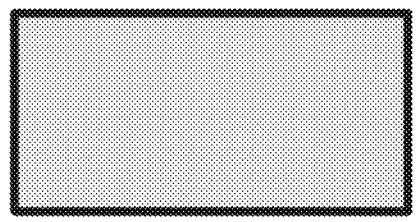
FIG. 14 shows examples about orientations of rectangular blocks.
Figure 14:
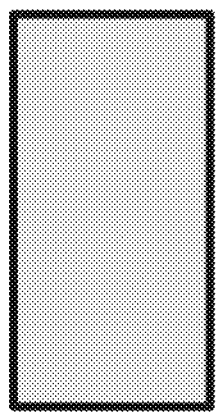

In this document, the terms "vertically oriented block" ("vertical orientation of a block") and "horizontally oriented block" ("horizontal orientation of a block") are applied to rectangular blocks generated by the QTBT framework. These terms have the same meaning as shown in FIG. 14.

Aspects of the present disclosure propose a mechanism to select different reference sample filters in order to consider orientation of a block. For example, width and height of a block are checked independently so that different reference sample filters are applied to reference sample located on different sides of a block to be predicted.

In some examples, it was described that interpolation filter selection is harmonized with the decision on main reference side selection. Both of these decisions currently rely on comparison of intra prediction mode with the diagonal (45 degree) direction.

Figure 15:
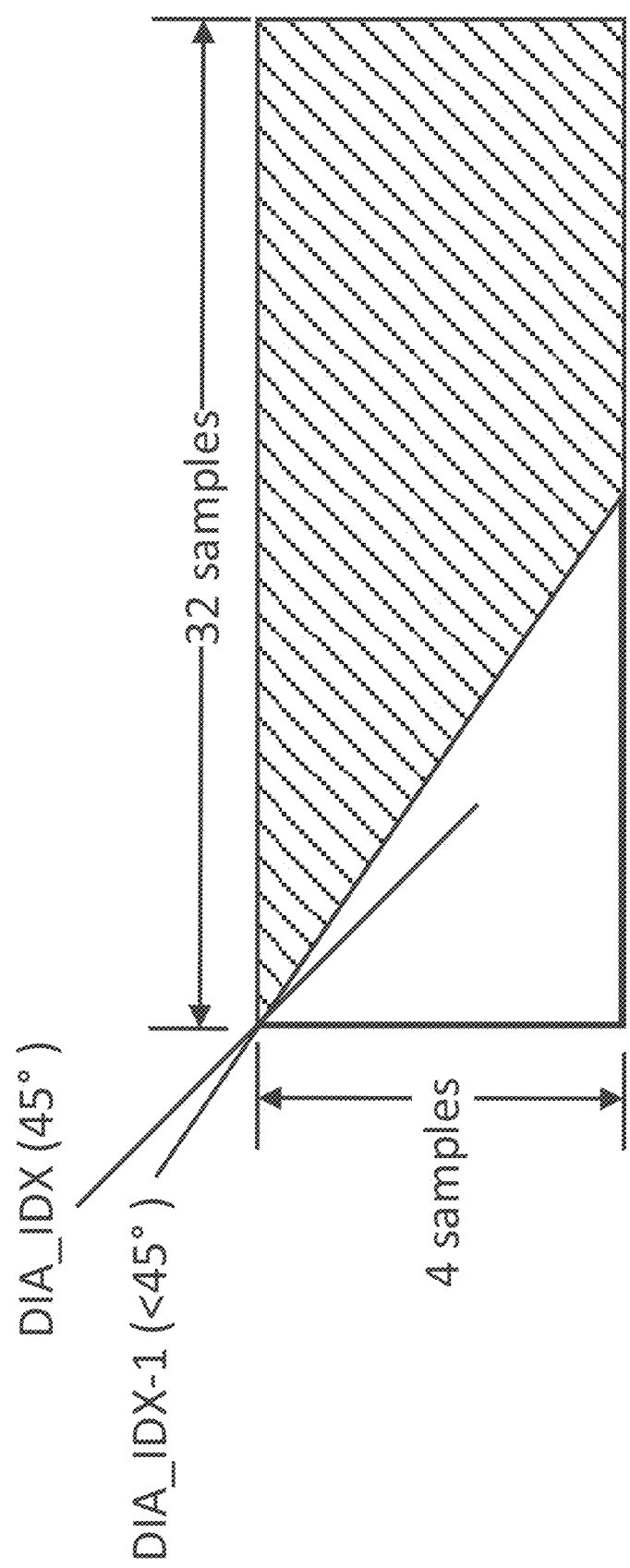
FIG. 15 shows another example of an interpolation filter selection.

However, it should be noticed that this design has a serious flaw for elongated blocks. From FIG. 15 it can be observed that even if a shorter side is selected as the main reference using mode comparison criteria, most of the predicted pixels would still be derived from the reference samples of the longer side (shown as dashed area). FIG. 15 shows an example about a side length dependent reference filter selection.

Figure 16:
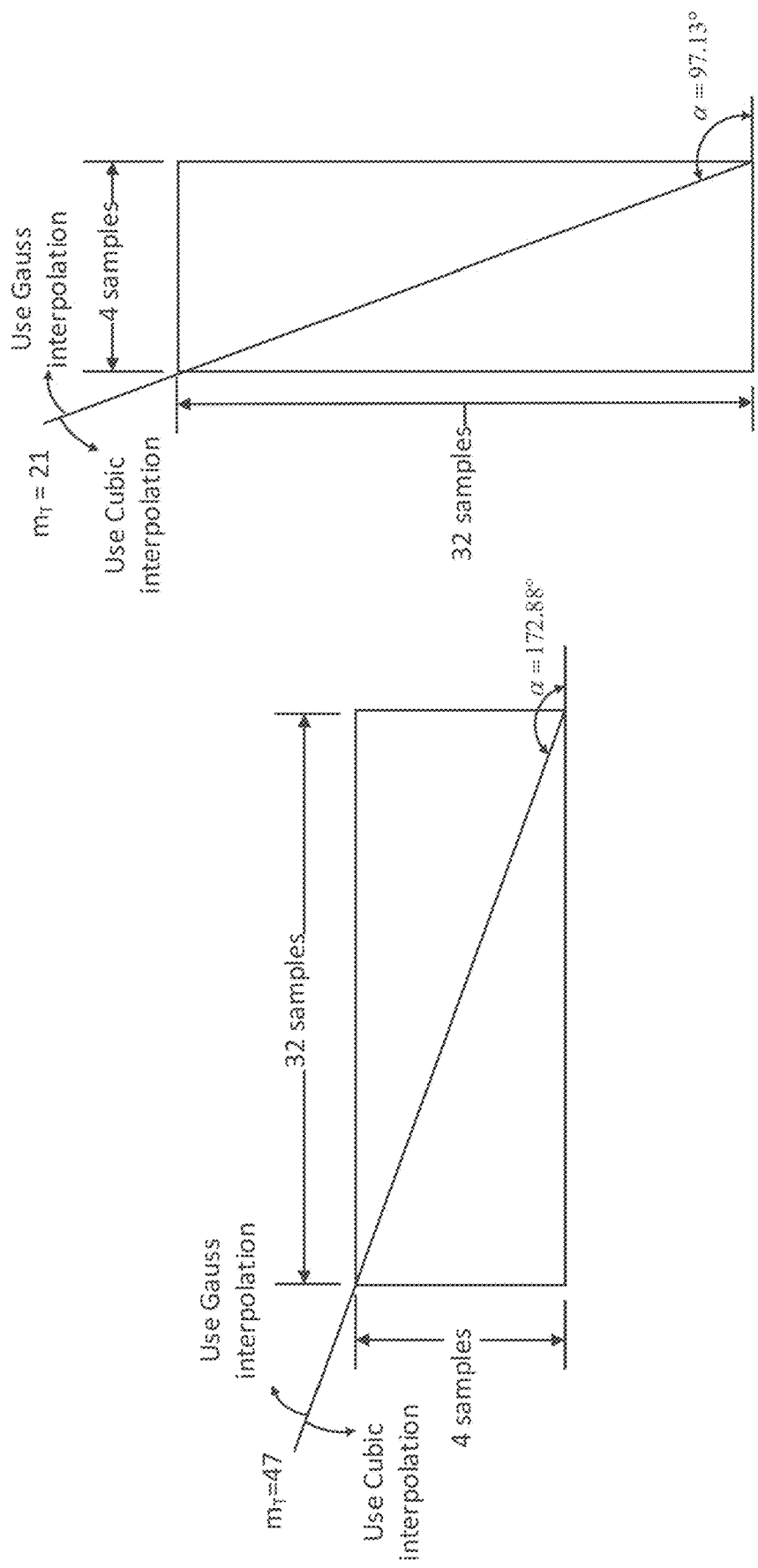
FIG. 16 shows another example of an interpolation filter selection.

The present disclosure proposes to use an alternative direction for thresholding an intra prediction mode during interpolation filter selection process. For example, the directions correspond to the angle of a main diagonal of the block to be predicted. For example, for blocks of size 32×4 and 4×32, threshold mode $m_T$ used to determine the reference sample filter is defined as shown in FIG. 16.

The value of the threshold intra prediction angle can be calculated using the following formula:

$$\alpha_T = \arctan\left(\frac{H}{W}\right),$$

Where W and H are the block width and height, respectively.

Figure 17:
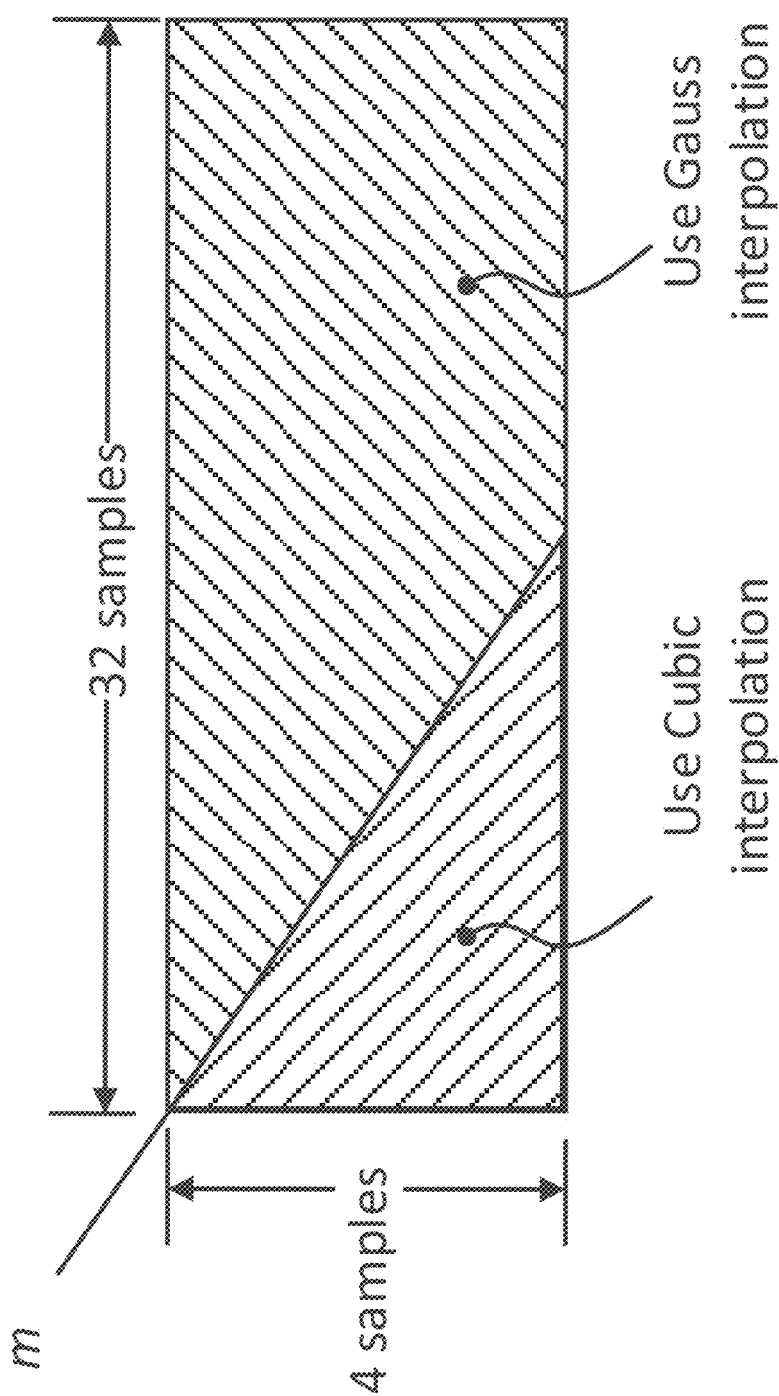
FIG. 17 shows another example of an interpolation filter selection.

Another embodiment of the present disclosure is to use different interpolation filters depending on which side the reference samples being used belong to. An example of this determination is shown in FIG. 17. FIG. 17 shows an example about usage of different interpolation filters depending on to which side the used reference samples belong to.

A straight line with an angle corresponding to intra direction m divides a predicted block into two areas. Samples belonging to different areas are predicted using different interpolation filters.

Exemplary values of $m_T$ (for the set of intra prediction modes defined in BMS1.0) and corresponding angles are given in Table 4. Angles α are given as shown in FIG. 16.

TABLE 4

Exemplary values of $m_T$ (for the set of intra prediction modes defined in BMS1.0)

| Aspect ratio $R_A = \log(W) - \log(H)$ | Angle of main diagonal$_\infty$, degrees | Threshold intra prediction mode $m_T$ |
| --- | --- | --- |
| −5 | 81.78 | 19 |
| −4 | 93.57 | 19 |
| −3 | 97.13 | 21 |
| −2 | 104.04 | 23 |
| −1 | 116.57 | 27 |
| 0 | 135.00 | DIA_IDX (34) |
| 1 | 153.44 | 41 |
| 2 | 165.96 | 45 |
| 3 | 172.88 | 47 |
| 4 | 176.42 | 49 |
| 5 | 178.21 | 49 |

Compared to existing technology and solutions, the present disclosure uses samples within a block that are predicted using different interpolation filters, wherein the interpolation filter used to predict a sample is selected according to a block shape, an orientation being horizontal or vertical, and an intra prediction mode angle.

The present disclosure may be applied at the stage of reference sample filtering. In particular, it is possible to determine a reference sample smoothing filter using similar rules described above for an interpolation filter selection process.

Figure 18:
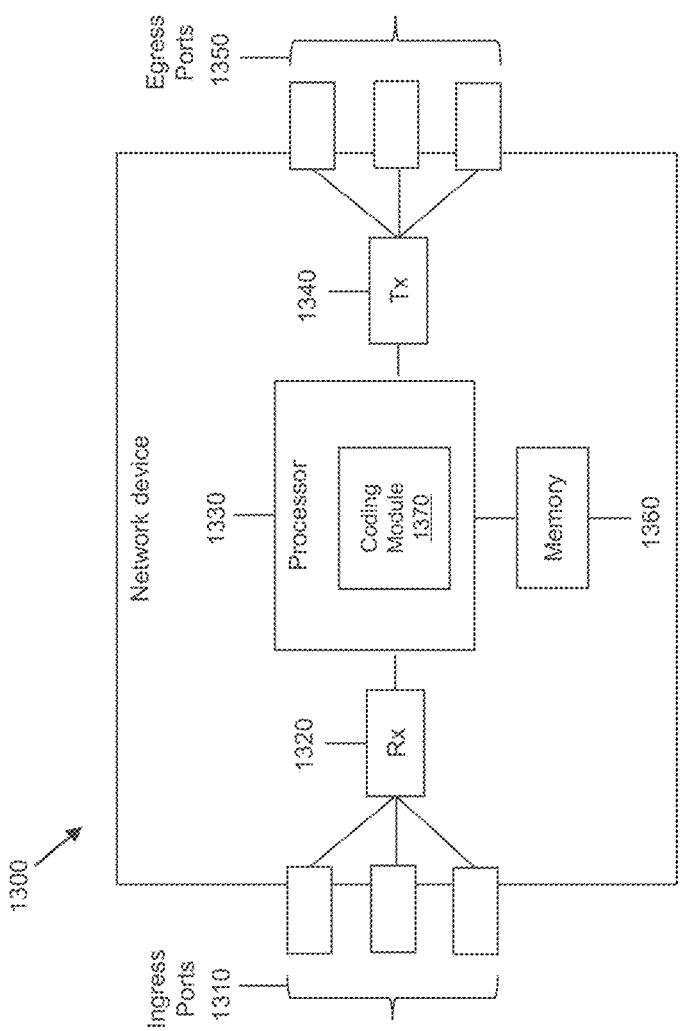
FIG. 18 is a schematic diagram of a network device.

FIG. 18 is a schematic diagram of a network device 1300 (e.g. a coding device) according to an embodiment of the disclosure. The network device 1300 is suitable for implementing the disclosed embodiments as described herein. The network device 1300 comprises ingress ports 1310 and receiver units (Rx) 1320 for receiving data; a processor, logic unit, or central processing unit (CPU) 1330 to process the data; transmitter units (Tx) 1340 and egress ports 1350 for transmitting the data; and a memory 1360 for storing the data. The network device 1300 may also comprise optical-to-electrical (OE) components and electrical-to-optical (EO) components coupled to the ingress ports 1310, the receiver units 1320, the transmitter units 1340, and the egress ports 1350 for egress or ingress of optical or electrical signals.

The processor 1330 is implemented by hardware and software. The processor 1330 may be implemented as one or more CPU chips, cores (e.g., as a multi-core processor), field-programmable gate arrays (FPGAs), application specific integrated circuits (ASICs), and digital signal processors (DSPs). The processor 1330 is in communication with the ingress ports 1310, receiver units 1320, transmitter units 1340, egress ports 1350, and memory 1360. The processor 1330 comprises a coding module 1370. The coding module 1370 implements the disclosed embodiments described above. For instance, the coding module 1370 implements, processes, prepares, or provides the various networking functions. The inclusion of the coding module 1370 therefore provides a substantial improvement to the functionality of the network device 1300 and effects a transformation of the network device 1300 to a different state. Alternatively, the coding module 1370 is implemented as instructions stored in the memory 1360 and executed by the processor 1330.

The memory 1360 comprises one or more disks, tape drives, and solid-state drives and may be used as an overflow data storage device, to store programs when such programs are selected for execution, and to store instructions and data that are read during program execution. The memory 1360 may be volatile and/or non-volatile and may be read-only memory (ROM), random access memory (RAM), ternary content-addressable memory (TCAM), and/or static random-access memory (SRAM).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

In the following description, reference is made to the accompanying drawings, which form part of the disclosure, and in which are shown, by way of illustration, specific aspects in which embodiments of the invention may be placed.

According to the HEVC/H.265 standard, 35 intra prediction modes are available. As shown in FIG.11, this set contains the following modes: planar mode (the intra prediction mode index is 0), DC mode (the intra prediction mode index is 1), and directional (angular) modes that cover the 180° range and have the intra prediction mode index value range of 2 to 34 shown by black arrows in FIG.11. To capture the arbitrary edge directions present in natural video, the number of directional intra modes is extended from 33, as used in HEVC, to 65. The additional directional modes are depicted as dotted arrows in FIG. 4, and the planar and DC modes remain the same. It is worth noting that the range that is covered by intra prediction modes can be wider than 180°. In particular, 62 directional modes with index values of 3 to 64 cover the range of approximately 230°, i.e. several pairs of modes have opposite directionality. In the case of the HEVC Reference Model (HM) and JEM platforms, only one pair of angular modes (namely, modes 2 and 66) has opposite directionality as shown in FIG. 4. For constructing a predictor, conventional angular modes take reference samples and (if needed) filter them to get a sample predictor. The number of reference samples required for constructing a predictor depends on the length of the filter used for interpolation (e.g., bilinear and cubic filters have lengths of 2 and 4, respectively).

In embodiments, e.g., according to the latest video coding standard currently in development, which is referred to as Versatile Video Coding (VVC), a combined Quad-tree nested multi-type tree using a binary and ternary split segmentation structure, is for example used to partition a coding tree unit. In the coding tree structure within a coding tree unit, a CU can have either a square or a rectangular shape. For example, the coding tree unit (CTU) is first partitioned by a quaternary tree. Then the quaternary tree leaf nodes can be further partitioned by a multi-type tree structure. There may be four splitting types in the multi-type tree structure, vertical binary splitting (SPLIT_BT_VER), horizontal binary splitting (SPLIT_BTHOR), vertical ternary splitting (SPLIT_TT_VER), and horizontal ternary splitting (SPLITJT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with a nested multi-type tree coding block structure. The exception occurs when a maximum supported transform length is smaller than the width or height of the colour component of the CU. a unique signaling mechanism of the partition splitting information in quadtree with nested multi-type tree coding tree structure. In the signaling mechanism, a coding tree unit (CTU) is treated as the root of a quaternary tree and is first partitioned by a quaternary tree structure. Each quaternary tree leaf node (when sufficiently large to allow it) is then further partitioned by a multi-type tree structure. In the multi-type tree structure, a first flag (mtt_split_cu_flag) is signalled to indicate whether the node is further partitioned; when a node is further partitioned, a second flag (mtt-split_cu_vertical_flag) is signalled to indicate the splitting direction, and then a third flag (mttsplit_cu_binary_flag) is signalled to indicate whether the split is a binary split or a ternary split. Based on the values of mtt_split_cu_vertical_flag and mtt_split_cu_binary_flag, the multi-type tree slitting mode (MttSplitMode) of a CU can be derived by a decoder based on a predefined rule or a table. It should be noted, for a certain design, for example, 64×64 Luma block and 32×32 Chroma pipelining design in VVC hardware decoders, TT split is forbidden when either width or height of a luma coding block is larger than 64, as shown in FIG. 6. TT split is also forbidden when either width or height of a chroma coding block is larger than 32. The pipelining design will divide a picture into Virtual pipeline data units s(VPDUs) which are defined as non-overlapping units in a picture. In hardware decoders, successive VPDUs can be processed by multiple pipeline stages simultaneously. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to increased VPDU sizes.

In addition, it should be noted that, when a portion of a tree node block exceeds the bottom or right picture boundary, the tree node block is forced to be split until the all samples of every coded CU are located inside the picture boundaries.

As an example, the Intra Sub-Partitions (ISP) tool may divide luma intra-predicted blocks vertically or horizontally into 2 or 4 sub-partitions depending on the block size.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC. As an example, several conventional angular intra prediction modes are adaptively replaced with wide-angle intra prediction modes for the non-square blocks, e.g. as defined in VVC. As another example, to avoid division operations for DC prediction, only the longer side is used to compute the average for non-square blocks. And, the results of intra prediction of planar mode may be further modified by a position dependent intra prediction combination (PDPC) method.

The intra-prediction unit is configured to use reconstructed samples of neighboring blocks of the same current picture to generate an intra-prediction block according to an intra-prediction mode of the set of intra-prediction modes.

The intra prediction unit (or in general the mode selection unit) is further configured to output intra-prediction parameters (or in general information indicative of the selected intra prediction mode for the block) to the entropy encoding unit in form of syntax elements for inclusion into the encoded picture data, so that, e.g., the video decoder may receive and use the prediction parameters for decoding.

Inter-Prediction

The set of (or possible) inter-prediction modes depends on the available reference pictures (i.e. previous at least partially decoded pictures, e.g. stored in DBP) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel, quarter-pel and/or 1/16 pel interpolation, or not.

Additional to the above prediction modes, skip mode, direct mode and/or other inter prediction modes may be applied.

For example, for Extended merge prediction, the merge candidate list of such mode is constructed by including the following five types of candidates in order: Spatial MVP from spatial neighbor CUs, Temporal MVP from collocated CUs, History-based MVP from an FIFO table, Pairwise average MVP and Zero MVs. And a bilateral-matching based decoder side motion vector refinement (DMVR) may be applied to increase the accuracy of the MVs of the merge mode. Merge mode with MVD (MMVD), which comes from merge mode with motion vector differences. A MMVD flag is signaled right after sending a skip flag and a merge flag to specify whether MMVD mode is used for a CU. And a CU-level adaptive motion vector resolution (AMVR) scheme may be applied. AMVR allows MVD of the CU to be coded in different precisions. Dependent on the prediction mode for the current CU, the MVDs of the current CU can be adaptively selected. When a CU is coded in merge mode, the combined inter/intra prediction (CIIP) mode may be applied to the current CU. Weighted averaging of the inter and intra prediction signals is performed to obtain the CIIP prediction. Affine motion compensated prediction, the affine motion field of the block is described by motion information of two control point (4-parameter) or three control point motion vectors (6-parameter). Subblock-based temporal motion vector prediction (SbTMVP), which is similar to the temporal motion vector prediction (TMVP) in HEVC, but predicts the motion vectors of the sub-CUs within the current CU. Bi-directional optical flow (BDOF), previously referred to as BIO, is a simpler version that requires much less computation, especially in terms of number of multiplications and the size of the multiplier. Triangle partition mode, in such a mode, a CU is split evenly into two triangle-shaped partitions, using either the diagonal split or the anti-diagonal split. Besides, the bi-prediction mode is extended beyond simple averaging to allow weighted averaging of the two prediction signals.

The inter prediction unit may include a motion estimation (ME) unit and a motion compensation (MC) unit (both not shown in FIG. 2). The motion estimation unit may be configured to receive or obtain the picture block (current picture block of the current picture) and a decoded picture, or at least one or a plurality of previously reconstructed blocks, e.g. reconstructed blocks of one or a plurality of other/different previously decoded pictures, for motion estimation. E.g. a video sequence may comprise the current picture and the previously decoded pictures, or in other words, the current picture and the previously decoded pictures may be part of or form a sequence of pictures forming a video sequence.

The encoder may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Figure 20:
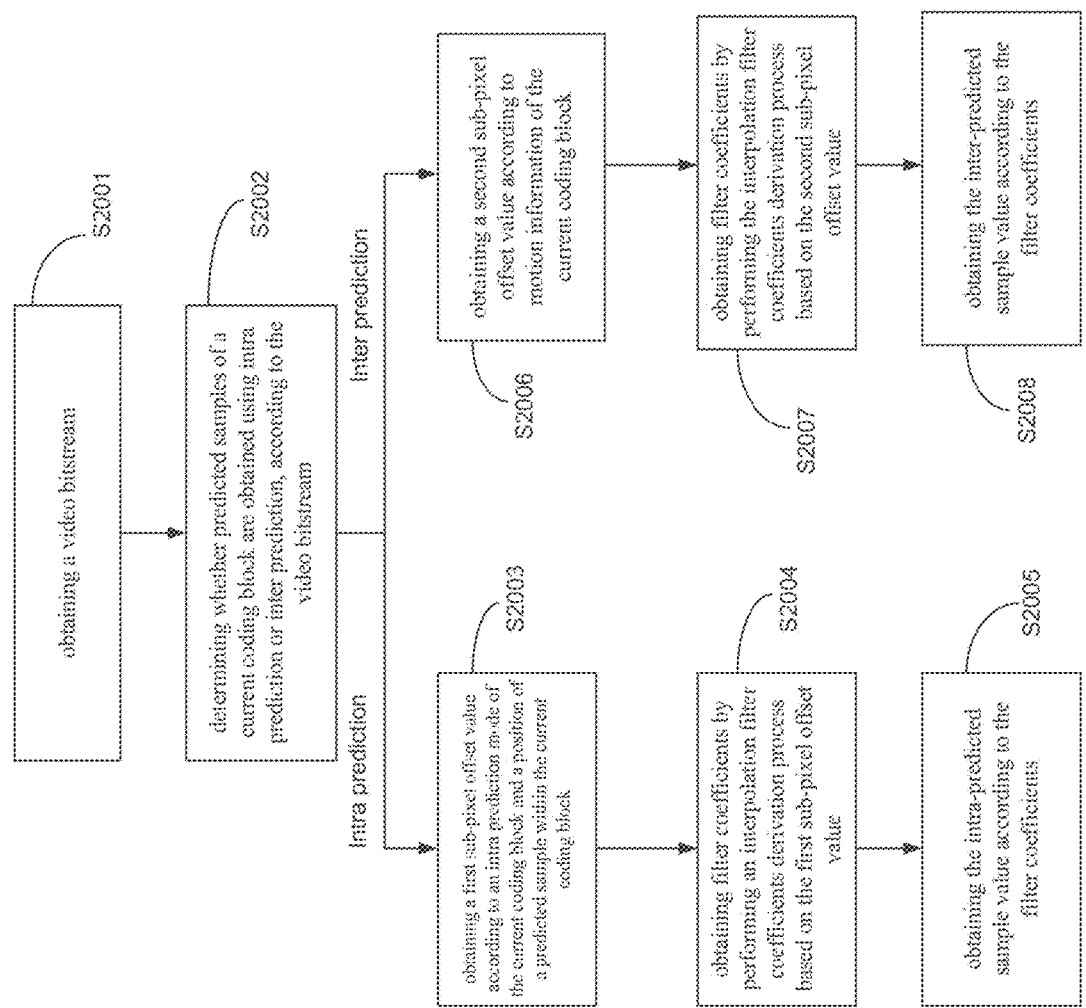
FIG. 20 is a flowchart showing a process according to certain aspects of the present disclosure.

As shown in FIG. 20, in an example, a method of video coding may comprise:

S2001: obtaining a video bitstream.

A decoder side receive an encoded video bitstream from another side (encoder side or network transmitter side), or the decoder side read the encoded video bitstream which stored in a memory of the decoder side.

The encoded video bitstream comprises information for decoding the encoded picture data, e.g. data that represents picture blocks of an encoded video and associated syntax elements.

S2002: determining whether predicted samples of a current coding block are obtained using intra prediction or inter prediction, according to the video bitstream.

In the decoder side, a current coding block is a block that is currently being reconstructed by the decoder. A current coding block is in a frame or picture of the video.

Whether predicted samples of a current coding block are obtained using intra prediction or inter prediction may be determined according to syntax elements in the video bitstream.

There may be one syntax element in the video bitstream is used to indicate the current coding block using inter prediction or intra prediction. For example, there is one flag in the bitstream is used to indicate the intra prediction process or inter prediction process is used for the current coding block. When a value of the flag is equal to 1 (or other values), then predicted samples of a current coding block are obtained using intra prediction; or when a value of the flag is equal to 0 (or other values), then predicted samples of a current coding block are obtained using inter prediction.

There also may be two or more syntax elements are used to indicate the current coding block using inter prediction or intra prediction. For example, there is one indication information (for example, a flag) in the bitstream is used to indicate whether the intra prediction process is used for the current coding block or not, and there is another indication information (for example, another flag) in the bitstream is used to indicate whether the inter prediction process is used for the current coding block or not.

When it's determined that predicted samples of the current coding block are obtained using intra prediction, go to step S2003. When it's determined that predicted samples of the current coding block are obtained using inter prediction, go to step S2006.

S2003: obtaining a first sub-pixel offset value according to an intra prediction mode of the current coding block and a position of a predicted sample within the current coding block.

In an example, the intra prediction mode of the current coding block may be also obtained according to the video bitstream.

FIG. 4 shows an example of 67 intra prediction modes, e.g., as proposed for VVC, the plurality of intra prediction modes of 67 intra prediction modes comprising: planar mode (index 0), dc mode (index 1), and angular modes with indices 2 to 66, wherein the left bottom angular mode in FIG. 4 refers to index 2 and the numbering of the indices being incremented until index 66 being the top right most angular mode of FIG. 4.

FIG. 11 illustrates a schematic diagram of a plurality of intra prediction modes used in the HEVC UIP scheme. For luminance blocks, the intra prediction modes may comprise up to 36 intra prediction modes, which may include three non-directional modes and 33 directional modes. The non-directional modes may comprise a planar prediction mode, a mean (DC) prediction mode, and a chroma from luma (LM) prediction mode. The planar prediction mode may perform predictions by assuming a block amplitude surface with a horizontal and vertical slope derived from the boundary of the block. The DC prediction mode may perform predictions by assuming a flat block surface with a value matching the mean value of the block boundary. The LM prediction mode may perform predictions by assuming a chroma value for the block matches the luma value for the block. The directional modes may perform predictions based on adjacent blocks as shown in FIG. 11.

An intra prediction mode of the current coding block may be obtained according to parse the video bitstream for the current coding block. In an example, a value of Most Probable Modes, MPM, flag for the current coding block is obtained according to the video bitstream. In an example, when the value of the MPM flag is true (for example, the value of the MPM flag is 1), a value of an index is obtained, the value of the index is used to indicate the intra prediction mode value of the current coding block in the MPM.

In another example, when the value of the MPM flag is true (for example, the value of the MPM flag is 1), a value of a second flag (for example, a Planar flag) is obtained. When the value of the second flag is false (in an example, the value of the second flag is false indicates that the intra prediction mode of the current coding block is not a Planar mode), a value of an index is obtained, the value of the index is used to indicate the intra prediction mode value of the current coding block in the MPM.

In an example, a syntax elements intra_luma_mpm_flag [x0][y0], intra_luma_mpm_idx[x0][y0] and intra_luma_mpm_remainder[x0][y0] specify the intra prediction mode for luma samples. The array indices x0, y0 specify the location (x0, y0) of the top-left luma sample of the considered prediction block relative to the top-left luma sample of the picture. When intra_luma_mpm_flag x0][y0] is equal to 1, the intra prediction mode is inferred from a neighbouring intra-predicted prediction unit.

In an example, when the value of the MPM flag is false (for example, the value of the MPM flag is 0), a value of an index is obtained, the value of the index is used to indicate the intra prediction mode value of the current coding block in the non-MPM.

A position of a predicted sample within the current coding block is obtained according to the slope of the intra prediction mode. Position of a samples within a predicted block (e.g. the current coding block) is defined relative to the position of the top-left predicted sample by a pair of integer values $(x_p, y_p)$, wherein $x_p$ is horizontal offset of the predicted sample relative to the top-left predicted sample and $y_p$ is the vertical offset of the predicted sample relative to the top-left predicted sample. Top-left predicted sample has a position defined as $x_p=0$, $y_p=0$.

To generate predicted samples from the reference samples the following steps are performed. Two ranges of intra prediction modes are defined. The first range of intra prediction modes corresponds to vertically-oriented prediction, and the second range of the intra prediction modes corresponds to horizontally-oriented modes. When an intra prediction mode specified for a predicted block belongs to the first range of the intra prediction modes, a block of predicted samples is further addressed with the position (x, y), wherein x set equal to $x_p$ and y set equal to $y_p$. When an intra prediction mode specified for a predicted block belongs to the second range of the intra prediction modes, a block of predicted samples is further addressed with the position (x, y), wherein x set equal to $y_p$ and y set equal to $x_p$. In some examples, the first range of intra prediction modes is defined as [34, 80]. The second range of intra prediction modes is defined as [−14, −1]∪[1, 33].

The inverse angle parameter invAngle is derived based on intraPredAngle as follows:

$$invAngle = \text{Round}\left(\frac{512*32}{intraPredAngle}\right)$$

Each intra prediction mode has an associated intra prediction variable, further referred to as "intraPredAngle". This association is shown in the Table 8-8.

Subpixel offset denoted as "iFact" and further also referred to as "the first sub-pixel offset value", is defined using the following equation:

iFact=((y+1+refIdx)*intraPredAngle) & 31

In this equation, refIdx denotes the offset of the reference sample set from the boundary of a predicted block. For a luma component this value could be obtained, e.g. as follows:

| intra_luma_ref_idx | refidx |
|---|---|
| 0 | 0 |
| 1 | 1 |
| 2 | 3 |

The value of syntax element "intra luma ref idx" is signaled in the bitstream.

An embodiment of the process to obtain predicted samples (as described VVC standard, JVET-O2001), is given further, wherein position (x,y) is always defined as $x=x_p$ and $y=y_p$ without dependency whether intra prediction mode is horizontally or vertically oriented: The values of the prediction samples predSamples[x][y], with x=0 . . . nTbW−1, y=0 . . . nTbH−1 are derived as follows:

If predModeIntra is greater than or equal to 34, the following ordered steps apply:
1. The reference sample array ref[x] is specified as follows:
    The following applies:

ref[x]=p[−1−refIdx+x][−1−refIdx], with x=0 . . . nTbW+refIdx+1

If intraPredAngle is less than 0, the main reference sample array is extended as follows:

ref[x]=p[−1−refIdx][−1−refIdx+Min((x*invAngle+256)»9, nTbH)], with x=−nTbH . . . 1

Otherwise, ref[x]=p[−1−refIdx+x][−1−refIdx], with x=nTbW+2+refIdx . . . refW+refIdx The additional samples ref[refW+refIdx+x] with x=1 . . . (Max(1, nTbW/nTbH)*refIdx+2) are derived as follows:

ref[refW+refIdx+x]=p[−1+refW][−1−refIdx]

2. The values of the prediction samples predSamples [x][y], with x=0 . . . nTbW−1, y=0 . . . nTbH−1 are derived as follows:
    The index variable iIdx and the multiplication factor iFact are derived as follows:

iIdx=(((y+1+refIdx)*intraPredAngle)»5)+refIdx iFact=((y+1+refIdx)*intraPredAngle) & 31

If cIdx is equal to 0, the following applies:
    The interpolation filter coefficients fT[j] with j=0 . . . 3 are derived as follows:

fT[j]=filterFlag?fG[iFact][j]:fC[iFact][j]

The value of the prediction samples predSamples [x][y] is derived as follows:

predSamples[x][y]=Clip1Y(((Σ$_{i=0}^{3}$fT[i]*ref[x=iIdx+i])+32)»6)

Otherwise (cIdx is not equal to 0), depending on the value of iFact, the following applies:
If iFact is not equal to 0, the value of the prediction samples predSamples[x][y] is derived as follows:

predSamples[x][y]=((32−iFact)*ref[x+iIdx+1]+iFact*ref[x+iIdx+2]+16)»5

Otherwise, the value of the prediction samples predSamples[x][y] is derived as follows:

predSamples[x][y]=ref[x+iIdx+1]

Otherwise (predModeIntra is less than 34), the following ordered steps apply:
1. The reference sample array ref[x] is specified as follows:
The following applies:

ref[x]=p[−1−refIdx][−1−refIdx+x], with x=0 . . . nTbH+refIdx+1

If intraPredAngle is less than 0, the main reference sample array is extended as follows:

ref[x]=p[−1−refIdx+Min((x*invAngle+256)»9, nTbQ)[ ]−1−refIdx], with x=−nTbW . . . −1

Otherwise,

Ref[x]=p[−1−refIdx][−1−refIdx+x], with x=nTbH+2+refIdx . . . refH+refIdx

The additional samples ref[refH+refIdx+x] with x=1 . . . (Max(1,nTbW/nTbH)*refIdx+2) are derived as follows:

ref[refH+refIdx+x]=p[−1+refH][−1−refIdx]

2. The values of the prediction samples predSamples[x][y], with x=0 . . . nTbW−1, y=0 . . . nTbH−1 are derived as follows:
The index variable iIdx and the multiplication factor iFact are derived as follows:

iIdx=(((x+1refIdx)*intraPredAngle)»5)+refIdx iFact=(x+1+refIdx)*intraPredAngle) & 31

If cIdx is equal to 0, the following applies:
The interpolation filter coefficients fT[j] with j=0 . . . 3 are derived as follows:

fT[j]=filterFlag?fG[iFact][j]:fC[iFact][j]

The value of the prediction samples predSamples[x][y] is derived as follows:

predSamples[x][y]=Clip1Y(((Σ$_{i=0}^{3}$fT[i]*ref[y+iIdx+i])+32)»6)

Otherwise (cIdx is not equal to 0), depending on the value of iFact, the following applies:
If iFact is not equal to 0, the value of the prediction samples predSamples[x][y] is derived as follows:

predSamples[x][y]=((32−iFact)*ref[y+iIdx+1]+iFact*ref[y+iIdx+2]+16)»5

Otherwise, the value of the prediction samples predSamples[x][y] is derived as follows:

predSamples[x][y]=ref[y+iIdx+1].

S2004: obtaining filter coefficients based on the first sub-pixel offset value.
In an example, obtaining filter coefficients based on the first sub-pixel offset value means that obtaining filter coefficients based on the predefined look up table and the first sub-pixel offset value. In an example, the first sub-pixel offset value is used as an index, the predefined look up table is used to describe the mapping relationship between the filter coefficients and the sub-pixel offset.

In an example, the predefined look up table is described as follows:

| Subpixel offset (Fractional sample position P) | $c_0$ | $c_1$ | $c_2$ | $c_3$ |
|---|---|---|---|---|
| 0 (integer) | 0 | 64 | 0 | 0 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 (half-pel) | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 | wherein "Subpixel offset" column is defined in 1/32 subpixel resolution, and $c_0$, $c_2$, $c_2$, $c_3$ are filter coefficients.

In another example, the predefined look up table is described as follows:

| Subpixel offset (Fractional sample position p) | $c_0$ | $c_1$ | $c_2$ | $c_3$ |
|---|---|---|---|---|
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 (half-pel) | −4 | 36 | 36 | −4 |
| 17 | −4 | 33 | 39 | −4 |
| 18 | −4 | 30 | 42 | −4 |
| 19 | −4 | 29 | 44 | −5 |

-continued

| Subpixel offset (Fractional sample position p) | $c_0$ | $c_1$ | $c_2$ | $c_3$ |
|---|---|---|---|---|
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 | wherein "Subpixel offset" column is defined in 1/32 subpixel resolution, and $c_0$, $c_1$, $c_2$, $c_3$ are filter coefficients.

In another possible implementation embodiment, result of the interpolation filter coefficients derivation process for both intra and inter prediction are coefficients of a 4-tap filter.

In one possible implementation embodiment, the interpolation filter coefficients derivation process is selected when a size of a main reference side used in intra prediction is smaller than or equal to a threshold.

In an example, filter coefficients are selected to be either Gaussian or Cubic, which are depending on a width value of a block or on a height value of a block. Decision on whether to use width or height is harmonized with the decision on main reference side selection. When a value of an intra prediction mode is greater than or equal to a value of a diagonal mode, top side of reference samples is selected to be the main reference side, and width value is selected to determine interpolation filter in use. When a value of an intra prediction mode is smaller than a value of a diagonal mode, main side reference is selected from the left side of the block and height value is used to control the filter selection process. For example, if the selected side length is smaller than or equal to 8 samples, 4-tap Cubic filter is applied. If the selected side length is greater than 8 samples, interpolation filter is a 4-tap Gaussian filter.

As for each intra prediction mode, there is one value corresponding to one intra prediction mode. Hence, the value relationship (e.g. less than, equal to, or greater than) among different intra prediction mode values may be used to select main side reference.

FIG. 12 shows an example of selection for modes smaller and greater than diagonal one (denoted as)45° in the case of 32×4 block. As showed in FIG. 12, if a value corresponding to the intra prediction mode of the current coding block is smaller than a value corresponding to the diagonal one, the left side (height) of the current coding block is selected as the main reference side. In this case an intra prediction mode specified for a predicted block is horizontally-oriented, i.e. this intra prediction mode belongs to the second range of the intra prediction modes. As the left side has 4 samples, which is smaller than a threshold (e.g. 8 samples), hence, a cubic interpolation filter is selected.

If a value corresponding to the intra prediction mode of the current coding block is greater than or equal to a value corresponding to the diagonal one, the top side (width) of the current coding block is selected as the main reference side. In this case an intra prediction mode specified for a predicted block is vertically-oriented, i.e. this intra prediction mode belongs to the first range of the intra prediction modes. As the top side has 32 samples, which is greater than a threshold (e.g. 8 samples), hence, a gauss interpolation filter is selected.

In an example, if a Cubic filter is selected, predicted sample is further clipped to the allowed range of values, that is either defined in sequence parameter set, SPS, or derived from the bit depth of the selected component.

In an example, as showed in FIG. 8, the dashed "4-tap interpolation filter with 6-bit coefficients for chroma" (further referred to as "Unified intra/inter filter") may be used for both processes: interpolation of intra- and inter-predicted samples.

An example that utilizes this design is shown in FIG. 9. In this implementation, a filtering module is being implemented as a separate unit that is being engaged in both: prediction of chrominance samples in motion compensation 906, and predicting luminance and chrominance samples when performing intra-prediction 907. In this implementation, hardware filtering part (e.g. 4-tap filter 904) is being used in both intra- and inter-prediction processes.

Another embodiment shows implementation when LUTs of filter coefficients are reused (see FIG. 10). FIG. 10 is an exemplary implementation of proposed application based on reusing LUT coefficients. In this implementation, hardware filtering modules loads coefficients from LUTs that are stored in ROM. A switch shown in intra prediction process determines the filter type being used, depending on the length of the main side selected for intra prediction process.

In another example, filter coefficients are selected to be either Gaussian or Cubic, which are depending on a threshold.

In some examples, for blocks of size 32×4 and 4×32, threshold mode $m_T$ used to determine reference sample filter is defined as it is shown in FIG. 16.

The value of the threshold intra prediction angle may be calculated using the following formula:

$$\alpha_T = \arctan\left(\frac{H}{W}\right),$$

Where W and H are the block width and height, respectively.
In an example, Specification of INTRA_ANGULAR2 . . . INTRA_ANGULAR66 intra prediction modes.
Inputs to this process are:
  the intra prediction mode predModeIntra,
  a variable refIdx specifying the intra prediction reference line index,
  a variable nTbW specifying the transform block width,
  a variable nTbH specifying the transform block height,
  a variable refW specifying the reference samples width,
  a variable refH specifying the reference samples height,
  a variable nCbW specifying the coding block width,
  a variable nCbH specifying the coding block height,
  a variable refFilterFlag specifying the value of reference filter flag,
  a variable cIdx specifying the colour component of the current block,
  the neighbouring samples p[x][y], with x=−1−refIdx, y=−1−refIdx . . . refH−1 and x=−refIdx . . . refW−1, y=−1−refIdx.
Outputs of this process are the predicted samples predSamples[x][y], with x=0 . . . nTbW−1, y=0 . . . nTbH−1.
The variable nTbS is set equal to (Log2 (nTbW)+Log2 (nTbH))»1.

The variable filterFlag is derived as follows:

If one or more of the following conditions is true, filterFlag is set equal to 0.

refFilterFlag is equal to 1 refIdx is not equal to 0

IntraSubPartitionsSplitType is not equal to ISP_NO_SPLIT

Otherwise, the following applies:
  The variable minDistVerHor is set equal to Min(Abs(predModeIntra−50), Abs(predModeIntra−18)).
  The variable intraHorVerDistThres[nTbS] is specified in Table 8-7.
  The variable filterFlag is derived as follows:
    If minDistVerHor is greater than intraHorVerDistThres[nTbS] and refFilterFlag is equal to 0, filterFlag is set equal to 1.
    Otherwise, filterFlag is set equal to 0.

TABLE 8-7

Specification of intraHorVerDistThres [nTbS] for various transform block sizes nTbS

| | nTbS = 2 | nTbS = 3 | nTbS = 4 | nTbS = 5 | nTbS = 6 | nTbS = 7 |
|---|---|---|---|---|---|---|
| intraHorVerDistThres[nTbS] | 24 | 14 | 2 | 0 | 0 | 0 |

Table 8-8 specifies the mapping table between predModeIntra and the angle parameter intraPredAnle.

TABLE 8-8

Specification of intraPredAngle

| predModeIntra | −14 | −13 | −12 | −11 | −10 | −9 | −8 | −7 | −6 | −5 | −4 | −3 | −2 | −1 | 2 | 3 | 4 |
|---|---|---|---|---|---|---|---|---|---|---|---|---|---|---|---|---|---|
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | −1 | −2 | −3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | −4 | −6 | −8 | −10 | −12 | −14 | −16 | −18 | −20 | −23 | −26 | −29 | −32 | −29 | −26 | −23 | −20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | −18 | −16 | −14 | −12 | −10 | −8 | −6 | −4 | −3 | −2 | −1 | 0 | 1 | 2 | 3 | 4 | 6 |
| predModeIntra | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | 74 | 75 | 76 | 77 | 78 | 79 | 80 | | | | | | | | | |
| intraPredAngle | 73 | 86 | 102 | 128 | 171 | 256 | 341 | 512 | | | | | | | | | |

The inverse angle parameter invAngle is derived based on intraPredAngle as follows:

$$invAngle = \text{Round}\left(\frac{512 * 32}{intraPredAngle}\right).$$

The interpolation filter coefficients fC[phase][j] and fG[phase][j] with phase=0 ... 31 and j=0 ... 3 are specified in Table 8-9.

TABLE 8-9

Specification of interpolation filter coefficients fC and fG

| Fractional sample position p | fC interpolation filter coefficients | | | | fG interpolation filter coefficients | | | |
|---|---|---|---|---|---|---|---|---|
| | f$_C$[p][0] | f$_C$[p][1] | f$_C$[p][2] | f$_C$[p][3] | fG[p][0] | fG[p][1] | fG[p][2] | fG[p][3] |
| 0 | 0 | 64 | 0 | 0 | 16 | 32 | 16 | 0 |
| 1 | −1 | 63 | 2 | 0 | 15 | 29 | 17 | 3 |
| 2 | −2 | 62 | 4 | 0 | 15 | 29 | 17 | 3 |
| 3 | −2 | 60 | 7 | −1 | 14 | 29 | 18 | 3 |
| 4 | −2 | 58 | 10 | −2 | 13 | 29 | 18 | 4 |
| 5 | −3 | 57 | 12 | −2 | 13 | 28 | 19 | 4 |
| 6 | −4 | 56 | 14 | −2 | 13 | 28 | 19 | 4 |
| 7 | −4 | 55 | 15 | −2 | 12 | 28 | 20 | 4 |
| 8 | −4 | 54 | 16 | −2 | 11 | 28 | 20 | 5 |
| 9 | −5 | 53 | 18 | −2 | 11 | 27 | 21 | 5 |
| 10 | −6 | 52 | 20 | −2 | 10 | 27 | 22 | 5 |
| 11 | −6 | 49 | 24 | −3 | 9 | 27 | 22 | 6 |
| 12 | −6 | 46 | 28 | −4 | 9 | 26 | 23 | 6 |
| 13 | −5 | 44 | 29 | −4 | 9 | 26 | 23 | 6 |

TABLE 8-9-continued

Specification of interpolation filter coefficients fC and fG

| Fractional sample position p | fC interpolation filter coefficients | | | | fG interpolation filter coefficients | | | |
|---|---|---|---|---|---|---|---|---|
| | $f_C[p][0]$ | $f_C[p][1]$ | $f_C[p][2]$ | $f_C[p][3]$ | fG[p][0] | fG[p][1] | fG[p][2] | fG[p][3] |
| 14 | −4 | 42 | 30 | −4 | 8 | 25 | 24 | 7 |
| 15 | −4 | 39 | 33 | −4 | 8 | 25 | 24 | 7 |
| 16 | −4 | 36 | 36 | −4 | 8 | 24 | 24 | 8 |
| 17 | −4 | 33 | 39 | −4 | 7 | 24 | 25 | 8 |
| 18 | −4 | 30 | 42 | −4 | 7 | 24 | 25 | 8 |
| 19 | −4 | 29 | 44 | −5 | 6 | 23 | 26 | 9 |
| 20 | −4 | 28 | 46 | −6 | 6 | 23 | 26 | 9 |
| 21 | −3 | 24 | 49 | −6 | 6 | 22 | 27 | 9 |
| 22 | −2 | 20 | 52 | −6 | 5 | 22 | 27 | 10 |
| 23 | −2 | 18 | 53 | −5 | 5 | 21 | 27 | 11 |
| 24 | −2 | 16 | 54 | −4 | 5 | 20 | 28 | 11 |
| 25 | −2 | 15 | 55 | −4 | 4 | 20 | 28 | 12 |
| 26 | −2 | 14 | 56 | −4 | 4 | 19 | 28 | 13 |
| 27 | −2 | 12 | 57 | −3 | 4 | 19 | 28 | 13 |
| 28 | −2 | 10 | 58 | −2 | 4 | 18 | 29 | 13 |
| 29 | −1 | 7 | 60 | −2 | 3 | 18 | 29 | 14 |
| 30 | 0 | 4 | 62 | −2 | 3 | 17 | 29 | 15 |
| 31 | 0 | 2 | 63 | −1 | 3 | 17 | 29 | 15 |

S2005: obtaining the intra-predicted sample value according to the filter coefficients. the intra-predicted sample value is used for Luma component of the current coding block. In one embodiment, Intra-predicted sample is calculated by convoluting with coefficients selected from Table 3 according to subpixel offset and filter type as follows:

$$s(x) = \left(\sum_{i=0}^{i<4}(ref_{i+x} \cdot c_i) + 32\right) \gg 6$$

In this equation ">>" indicates a bitwise shift-right operation, $c_i$ denotes a coefficient of set of derived filter coefficients using the first subpixel offset value, s(x) denotes an intra predicted sample at position (x,y), $ref_{i+x}$ denotes a set of reference samples, wherein $ref_{1+x}$ is located at position (xr, yr), this position of reference sample is defined as follows:

$x_r=(((y+1+\text{refIdx})*\text{intraPredAngle})\gg 5)+\text{refIdx}$;

$y_r=\gg -1-\text{refIdx}$

In an example, the values of the prediction samples predSamples[x][y], with x=0 . . . nTbW−1, y=0 . . . nTbH−1 are derived as follows:
  If predModeIntra is greater than or equal to 34, the following ordered steps apply:
    The reference sample array ref[x] is specified as follows:
      The following applies:

ref[x]=p[−1−refIdx+x][−1−refIdx], with x=0 . . . nTbW+refIdx+1

If intraPredAngle is less than 0, the main reference sample array is extended as follows:

ref[x]=p[−1−refIdx][−1−refIdx+Min((x*invAngle+256)≫9, nTbH)], with x=−nTbH . . . −1

Otherwise, ref[x]=p[−1−refIdx+x][−1−refIdx], with x=nTbW+2+refIdx . . . refW+refIdx The additional samples ref[refW+refIdx+x] with x=1 . . . (Max(1, nTbW/nTbH)*refIdx+2) are derived as follows:

ref[refW+refIdx+x]=p[−1+refW][−1−refIdx]

The values of the prediction samples predSamples[x][y], with x=0 . . . nTbW−1, y=0 . . . nTbH−1 are derived as follows:
    The index variable iIdx and the multiplication factor iFact are derived as follows:

iIdx=(((y+1+refIdx)*intraPredAngle)≫5)+refIdx iFact=((y+1+refIdx)*intraPredAngle) & 31

If cIdx is equal to 0, the following applies:
      The interpolation filter coefficients fT[j] with j=0 . . . 3 are derived as follows:

fT[j]=filterFlag?fF[iFact][j]:fC[iFact][j]

The value of the prediction samples predSamples[x][y] is derived as follows:

predSamples[x][y]=Clip1Y(((Σ$_{i=0}^{3}$fT[i]*ref[x+iIdx+i])+32)≫6)

Otherwise (cIdx is not equal to 0), depending on the value of iFact, the following applies:
      If iFact is not equal to 0, the value of the prediction samples predSamples[x][y] is derived as follows:

predSamples[x][y]=((32 −iFact)*ref[x+iIdx+1]+ iFact*ref[x+iIdx+2]+16)≫5

Otherwise, the value of the prediction samples predSamples[x][y] is derived as follows:

predSamples[x][y]=ref[x+iIdx+1]

Otherwise (predModeIntra is less than 34), the following ordered steps apply:
    The reference sample array ref[x] is specified as follows:
      The following applies:

ref[x]+p[−1−refIdx][−1−refIdx+x], with x=0 . . . nTbH+refIdx+1

If intraPredAngle is less than 0, the main reference sample array is extended as follows:

ref[x]=p[-1-refIdx+Min((x*invAngle+256)>>9, nTbW)][-1-refidx], with x=-nTbW . . . -1

Otherwise, ref[x]=p[-1-refIdx][-1-refIdx+x], with x=nTbH'2+ refIdx . . . refH+refIdx The additional samples ref[refH+refIdx+x] with x=1 . . . (Max(1, nTbW/nTbH)*refIdx+2) are derived as follows:

ref[refH+refIdx+x]=p[-1+refH][-1-refIdx]

The values of the prediction samples predSamples[x][y], with x=0 . . . nTbW-1, y=0 . . . nTbH-1 are derived as follows:
The index variable iIdx and the multiplication factor iFact are derived as follows:

iIdx=(((x+1+refIdx)*intraPredAngle)>>5)+refIdx iFact=((x+1+refIdx)*intraPredAngle) & 31

If cldx is equal to 0, the following applies:
The interpolation filter coefficients fT[j] with j=0 . . . 3 are derived as follows:

fT[j]=filterFlag?fG[iFact][j]:fC[iFact][j]

The value of the prediction samples predSamples[x][y] is derived as follows:

predSamples[x][y]=Clip1Y(((Σ$_{i=0}^{3}$fT[i]*ref[y+iIdx+i])+32)>>6)

Otherwise (cldx is not equal to 0), depending on the value of iFact, the following applies:
If iFact is not equal to 0, the value of the prediction samples predSamples[x][y] is derived as follows:

predSamples[x][y]=((32-iFact)*ref[y+iIdx+1]+ iFact*ref[y+iIdx+2]+16)>>5

Otherwise, the value of the prediction samples predSamples[x][y] is derived as follows:

predSamples[x][y]=ref[y+iIdx+1]

S2006: obtaining a second sub-pixel offset value according to motion information of the current coding block.
The motion information of the current coding block is signaled in the bitstream. The motion information may comprise motion vectors and other syntax elements, that are used in inter prediction.
In an example, the first sub-pixel offset value may equal to the second sub-pixel offset value. In another example, the first sub-pixel offset value may different with the second sub-pixel offset value.
S2007: obtaining filter coefficients based on the second sub-pixel offset value.
In a possible implementation embodiment, the interpolation filter coefficients derivation process which is used in the inter prediction is performed the same predefined look up table which is used in the intra prediction. In this example, obtaining filter coefficients based on the second sub-pixel offset value means that obtaining filter coefficients based on the predefined look up table and the second sub-pixel offset value. In an example, the second sub-pixel offset value is used as an index, the predefined look up table is used to describe the mapping relationship between the filter coefficients and the sub-pixel offset.
In an example, the predefined look up table is described as follows:

| Subpixel offset (Fractional sample position p) | $c_0$ | $c_1$ | $c_2$ | $c_3$ |
|---|---|---|---|---|
| 0 (integer) | 0 | 64 | 0 | 0 |
| 1 | -1 | 63 | 2 | 0 |
| 2 | -2 | 62 | 4 | 0 |
| 3 | -2 | 60 | 7 | -1 |
| 4 | -2 | 58 | 10 | -2 |
| 5 | -3 | 57 | 12 | -2 |
| 6 | -4 | 56 | 14 | -2 |
| 7 | -4 | 55 | 15 | -2 |
| 8 | -4 | 54 | 16 | -2 |
| 9 | -5 | 53 | 18 | -2 |
| 10 | -6 | 52 | 20 | -2 |
| 11 | -6 | 49 | 24 | -3 |
| 12 | -6 | 46 | 28 | -4 |
| 13 | -5 | 44 | 29 | -4 |
| 14 | -4 | 42 | 30 | -4 |
| 15 | -4 | 39 | 33 | -4 |
| 16 (half-pel) | -4 | 36 | 36 | -4 |
| 17 | -4 | 33 | 39 | -4 |
| 18 | -4 | 30 | 42 | -4 |
| 19 | -4 | 29 | 44 | -5 |
| 20 | -4 | 28 | 46 | -6 |
| 21 | -3 | 24 | 49 | -6 |
| 22 | -2 | 20 | 52 | -6 |
| 23 | -2 | 18 | 53 | -5 |
| 24 | -2 | 16 | 54 | -4 |
| 25 | -2 | 15 | 55 | -4 |
| 26 | -2 | 14 | 56 | -4 |
| 27 | -2 | 12 | 57 | -3 |
| 28 | -2 | 10 | 58 | -2 |
| 29 | -1 | 7 | 60 | -2 |
| 30 | 0 | 4 | 62 | -2 |
| 31 | 0 | 2 | 63 | -1 | wherein "Subpixel offset" column is defined in 1/32 subpixel resolution, and $c_0$, $c_1$, $c_2$, $c_3$ are filter coefficients.
In another example, the predefined look up table is described as follows:

| Subpixel offset (Fractional sample position p) | $c_0$ | $c_1$ | $c_2$ | $c_3$ |
|---|---|---|---|---|
| 1 | -1 | 63 | 2 | 0 |
| 2 | -2 | 62 | 4 | 0 |
| 3 | -2 | 60 | 7 | -1 |
| 4 | -2 | 58 | 10 | -2 |
| 5 | -3 | 57 | 12 | -2 |
| 6 | -4 | 56 | 14 | -2 |
| 7 | -4 | 55 | 15 | -2 |
| 8 | -4 | 54 | 16 | -2 |
| 9 | -5 | 53 | 18 | -2 |
| 10 | -6 | 52 | 20 | -2 |
| 11 | -6 | 49 | 24 | -3 |
| 12 | -6 | 46 | 28 | -4 |
| 13 | -5 | 44 | 29 | -4 |
| 14 | -4 | 42 | 30 | -4 |
| 15 | -4 | 39 | 33 | -4 |
| 16 (half-pel) | -4 | 36 | 36 | -4 |
| 17 | -4 | 33 | 39 | -4 |
| 18 | -4 | 30 | 42 | -4 |
| 19 | -4 | 29 | 44 | -5 |
| 20 | -4 | 28 | 46 | -6 |
| 21 | -3 | 24 | 49 | -6 |
| 22 | -2 | 20 | 52 | -6 |
| 23 | -2 | 18 | 53 | -5 |
| 24 | -2 | 16 | 54 | -4 |
| 25 | -2 | 15 | 55 | -4 |
| 26 | -2 | 14 | 56 | -4 |
| 27 | -2 | 12 | 57 | -3 |
| 28 | -2 | 10 | 58 | -2 |

| Subpixel offset (Fractional sample position p) | $c_0$ | $c_1$ | $c_2$ | $c_3$ |
|---|---|---|---|---|
| 29 | −1 | 7 | 60 | −2 |
| 30 | 0 | 4 | 62 | −2 |
| 31 | 0 | 2 | 63 | −1 | wherein "Subpixel offset" column is defined in 1/32 subpixel resolution, and $c_0$, $c_1$, $c_2$, $c_3$ are filter coefficients.

When a value of Subpixel offset is equal to 0, the filter coefficients are not required to obtain inter-predicted samples. In a first alternative embodiment, the following step could be performed:

$$\text{predSampleLX}_c = (\Sigma_{i=0}^{3} f_c[\text{xFrac}_c][i] * \text{refPicLX}_c[\text{xInt}_i][\text{yInt}_1]) \gg \text{shift1}$$

In a second alternative embodiment, the following step could be performed:

$$\text{predSampleLX}_c = (\Sigma_{i=0}^{3} f_c[\text{yFrac}_c][i] * \text{refPicLX}_c[\text{xInt}_1][\text{yInt}_i]) \gg \text{shift1}$$

In a third alternative embodiment, the following step could be performed:

The sample array temp[n] with n=0 . . . 3, is derived as follows:

$$\text{temp}[n] = (\Sigma_{i=0}^{3} f_c[\text{xFrac}_c][i] * \text{refPicLX}_c[\text{xInt}_i][\text{yInt}_n]) \gg \text{shift1}$$

The predicted chroma sample value predSampleLXc is derived as follows:

$$\text{predSampleLX}_c = (f_c[\text{yFrac}_c][0] * \text{temp}[0] + f_c[\text{yFrac}_c][1] * \text{temp}[1] + f_c[\text{yFrac}_c][2] * \text{temp}[2] + f_c[\text{yFrac}_c][3] * \text{temp}[3]) \gg \text{shift2}$$

In all the three above-disclosed alternative embodiments, yFracc and xFracc are set equal to 0, fC[0][0]=0, fC[0][1]=64, fC[0][2]=0, fC[0][3]=0.

In another possible implementation embodiment, result of the interpolation filter coefficients derivation process for both intra and inter prediction are coefficients of a 4-tap filter.

S2008: obtaining the inter-predicted sample value according to the filter coefficients.

In a possible implementation embodiment, the inter-predicted sample value is used for Chroma component of the current coding block.

In an example, Chroma sample interpolation process is disclosed.

Inputs to this process are:
  a chroma location in full-sample units (xIntc, yIntc),
  a chroma location in 1/32 fractional-sample units (xFrac$_c$, yFrac$_c$),
  a chroma location in full-sample units (xSbIntC, ySbIntC) specifying the top-left sample of the bounding block for reference sample padding relative to the top-left chroma sample of the reference picture,
  a variable sbWidth specifying the width of the current subblock,
  a variable sbHeight specifying the height of the current subblock,
  the chroma reference sample array refPicLX$_c$.
Output of this process is a predicted chroma sample value predSampleLX$_c$.

The variables shift1, shift2 and shift3 are derived as follows:
  The variable shift1 is set equal to Min(4, BitDepth$_c$−8), the variable shift2 is set equal to 6 and the variable shift3 is set equal to Max(2, 14−BitDepthc).
  The variable picW$_c$ is set equal to pic_width_inlumasamples/SubWidthC and the variable picH$_c$ is set equal to pic_height_in_luma_samples/SubHeightC.
The chroma interpolation filter coefficients f$_c$[p] for each 1/32 fractional sample position p equal to xFrac$_c$ or yFrac$_c$ are specified in Table 8-13.
The variable xOffset is set equal to (sps_ref_wraparound_offset_minus1+1)*MinCbSizeY)/SubWidthC.
The chroma locations in full-sample units (xInt$_i$, yInt$_i$) are derived as follows for i=0 . . . 3:
  If subpic_treated_as_pic_flag[SubPicIdx] is equal to 1, the following applies:

xInt$_i$=Clip3(SubPicLeftBoundryPos/SubPicRight-BoundryPos/SubWidthC, xInt$_L$+i)

yInt$_i$=Clip3(SubPicTopBoundryPos/SubHeightC,Sub-PicBotBoundryPos/SubHeightC, yInt$_L$+i)

Otherwise (subpic_treated_as_pic_flag[SubPicIdx] is equal to 0), the following applies:

xInt$_i$=Clip3(0, picW$_c$−1, sps_ref_wraparound_enables_flag?ClipH(xOffset, picW$_c$, xInt$_c$+i−1): xInt$_c$+i−1)

yInt$_i$=Clip3(0, picH$_c$−1, yInt$_c$+i−1)

The chroma locations in full-sample units (xInt$_i$, yInt$_i$) are further modified as follows for i=0 . . . 3:

xInt$_i$=Clip3(xSbIntC+xSubIntC+sbWidth+2, xInt$_i$)

yInt$_i$=Clip3(ySbIntC−1, ySbIntC+sbHeight+2, yInt$_i$)

The predicted chroma sample value predSampleLX$_c$ is derived as follows:
  If both xFrac$_c$ and yFrac$_c$ are equal to 0, the value of predSampleLX$_c$ is derived as follows:

predSampleLX$_c$=refPicLX$_c$[xInt$_1$][yInt$_1$]≪shift3

Otherwise, if xFrac$_c$ is not equal to 0 and yFrac$_c$ is equal to 0, the value of predSampleLX$_c$ is derived as follows:

predSampleLX$_c$=($\Sigma_{i=0}^{3}$fC[xFrac$_c$][i]*refPicLX$_c$[xInt$_i$][yInt$_1$])≫shift1

Otherwise, if xFrac$_c$ is equal to 0 and yFrac$_c$ is not equal to 0, the value of predSampleLX$_c$ is derived as follows:

predSampleLX$_c$=($\Sigma_{i=0}^{3}$fc[yFrac$_c$][i]*refPicLXc[xInt$_1$][yInt$_i$])≫shift1

Otherwise, if xFrac$_c$ is not equal to 0 and yFrac$_c$ is not equal to 0, the value of predSampleLX$_c$ is derived as follows:
    The sample array temp[n] with n=0 . . . 3, is derived as follows:

temp[n]=($\Sigma_{i=0}^{3}$fc[xFrac$_c$][i]*refPicLXc[xInt$_i$][yInt$_n$])≫shift1

The predicted chroma sample value predSampleLX$_c$ is derived as follows:

predSampleLX$_c$=(f$_c$[yFrac$_c$][0]*temp[0]+f$_c$[yFrac$_c$][1]*temp[1]+f$_c$[yFrac$_c$][2]*temp[2]+f$_c$[yFrac$_c$][3]*temp[3])≫shift2.

A decoder comprising processing circuitry configured for carrying out the above methods.

In the present disclosure, a computer program product comprising a program code is disclosed for performing the above methods.

In the present disclosure, a decoder for decoding video data is disclosed, the decoder comprising: one or more processors; and a non-transitory computer-readable storage medium coupled to the processors and storing programming for execution by the processors, wherein the programming, when executed by the processors, configures the decoder to carry out the above methods.

FIG. 18 is a schematic diagram of a network device 1300 according to an embodiment of the disclosure. The network device 1300 is suitable for implementing the disclosed embodiments as described herein. The network device 1300 comprises ingress ports 1310 and receiver units (Rx) 1320 for receiving data; a processor, logic unit, or central processing unit (CPU) 1330 to process the data; transmitter units (Tx) 1340 and egress ports 1350 for transmitting the data; and a memory 1360 for storing the data. The network device 1300 may also comprise optical-to-electrical (OE) components and electrical-to-optical (EO) components coupled to the ingress ports 1310, the receiver units 1320, the transmitter units 1340, and the egress ports 1350 for egress or ingress of optical or electrical signals.

The processor 1330 is implemented by hardware and software. The processor 1330 may be implemented as one or more CPU chips, cores (e.g., as a multi-core processor), field-programmable gate arrays (FPGAs), application specific integrated circuits (ASICs), and digital signal processors (DSPs). The processor 1330 is in communication with the ingress ports 1310, receiver units 1320, transmitter units 1340, egress ports 1350, and memory 1360. The processor 1330 comprises a coding module 1370. The coding module 1370 implements the disclosed embodiments described above. For instance, the coding module 1370 implements, processes, prepares, or provides the various networking functions. The inclusion of the coding module 1370 therefore provides a substantial improvement to the functionality of the network device 1300 and effects a transformation of the network device 1300 to a different state. Alternatively, the coding module 1370 is implemented as instructions stored in the memory 1360 and executed by the processor 1330.

The memory 1360 comprises one or more disks, tape drives, and solid-state drives and may be used as an overflow data storage device, to store programs when such programs are selected for execution, and to store instructions and data that are read during program execution. The memory 1360 may be volatile and/or non-volatile and may be read-only memory (ROM), random access memory (RAM), ternary content-addressable memory (TCAM), and/or static random-access memory (SRAM).

Figure 19:
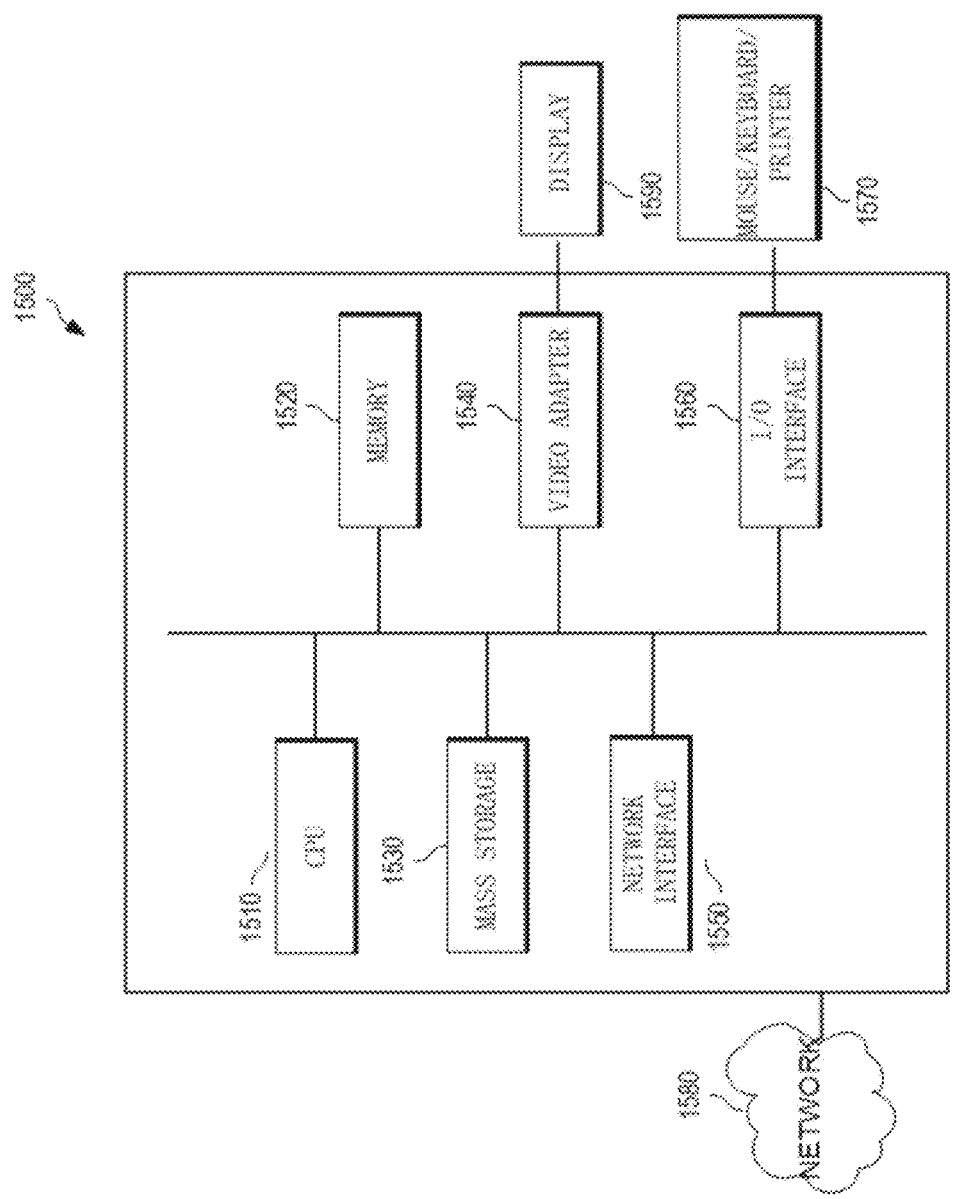
FIG. 19 shows a block diagram of an apparatus.

FIG. 19 is a block diagram of an apparatus 1500 that can be used to implement various embodiments. The apparatus 1500 may be the source device 102 as shown in FIG. 1, or the video encoder 200 as shown in FIG. 2, or the destination device 104 as shown in FIG. 1, or the video decoder 300 as shown in FIG. 3. Additionally, the apparatus 1100 can host one or more of the described elements. In some embodiments, the apparatus 1100 is equipped with one or more input/output devices, such as a speaker, microphone, mouse, touchscreen, keypad, keyboard, printer, display, and the like. The apparatus 1500 may include one or more central processing units (CPUs) 1510, a memory 1520, a mass storage 1530, a video adapter 1540, and an I/O interface 1560 connected to a bus. The bus is one or more of any type of several bus architectures including a memory bus or memory controller, a peripheral bus, a video bus, or the like.

The CPU 1510 may have any type of electronic data processor. The memory 1520 may have, or be, any type of system memory such as static random access memory (SRAM), dynamic random access memory (DRAM), synchronous DRAM (SDRAM), read-only memory (ROM), a combination thereof, or the like. In an embodiment, the memory 1520 may include ROM for use at boot-up, and DRAM for program and data storage for use while executing programs. In embodiments, the memory 1520 is non-transitory. The mass storage 1530 includes any type of storage device that stores data, programs, and other information and to make the data, programs, and other information accessible via the bus. The mass storage 1530 includes, for example, one or more of a solid state drive, hard disk drive, a magnetic disk drive, an optical disk drive, or the like.

The video adapter 1540 and the I/O interface 1560 provide interfaces to couple external input and output devices to the apparatus 1100. For example, the apparatus 1100 may provide SQL command interface to clients. As illustrated, examples of input and output devices include a display 1590 coupled to the video adapter 1540 and any combination of mouse/keyboard/printer 1570 coupled to the I/O interface 1560. Other devices may be coupled to the apparatus 1100, and additional or fewer interface cards may be utilized. For example, a serial interface card (not shown) may be used to provide a serial interface for a printer.

The apparatus 1100 also includes one or more network interfaces 1550, which includes wired links, such as an Ethernet cable or the like, and/or wireless links to access nodes or one or more networks 1580. The network interface 1550 allows the apparatus 1100 to communicate with remote units via the networks 1580. For example, the network interface 1550 may provide communication to database. In an embodiment, the apparatus 1100 is coupled to a local-area network or a wide-area network for data processing and communications with remote devices, such as other processing units, the Internet, remote storage facilities, or the like.

Piecewise linear approximation is introduced in order to calculate the values of weighting coefficients required for predicting pixels within a given block. The piecewise linear approximation is, on the one hand, significantly reduces the computational complexity of the distance-weighted prediction mechanism as compared with straightforward weighting coefficient calculation and, on the other hand, helps to achieve higher accuracy of weighting coefficient values as compared with prior-art simplifications.

The embodiments may be applied to other bidirectional and position dependent intra-prediction techniques (e.g., different modifications of PDPC) as well as mechanisms that use weighting coefficients that depend on distance from one pixel to another to blend different parts of a picture (e.g., some blending methods in image processing).

Implementations of the subject matter and the operations described in this disclosure may be implemented in digital electronic circuitry, or in computer software, firmware, or hardware, including the structures disclosed in this disclosure and their structural equivalents, or in combinations of one or more of them. Implementations of the subject matter described in this disclosure may be implemented as one or more computer programs, i.e., one or more modules of computer program instructions, encoded on computer storage medium for execution by, or to control the operation of, data processing apparatus. Alternatively or in addition, the program instructions may be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate physical and/or non-transitory components or media (for example, multiple CDs, disks, or other storage devices).

In some implementations, the operations described in this disclosure may be implemented as a hosted service provided on a server in a cloud computing network. For example, the computer-readable storage media may be logically grouped and accessible within a cloud computing network. Servers within the cloud computing network may include a cloud computing platform for providing cloud-based services. The terms "cloud," "cloud computing," and "cloud-based" may be used interchangeably as appropriate without departing from the scope of this disclosure. Cloud-based services may be hosted services that are provided by servers and delivered across a network to a client platform to enhance, supplement, or replace applications executed locally on a client computer. The circuit may use cloud-based services to quickly receive software upgrades, applications, and other resources that would otherwise require a lengthy period of time before the resources may be delivered to the circuit.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program may be deployed to be executed on one computer or on multiple computers that are located at one site or distributed across multiple sites and interconnected by a communication network.

The processes and logic flows described in this disclosure may be performed by one or more programmable processors executing one or more computer programs to perform actions by operating on input data and generating output. The processes and logic flows may also be performed by, and apparatus may also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer may be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory may be supplemented by, or incorporated in, special purpose logic circuitry.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

In the following, further examples are described wherein the numbering of the embodiments may not necessarily match with the numbering used in the previous text.

Embodiment 1. A method for intra prediction, wherein the method comprises: using an interpolation filter for chrominance component as the interpolation filter for intra prediction of a block.

Embodiment 2. The method of Embodiment 1, wherein a look-up table of the interpolation filter for a chrominance component is the same as a look-up table of the interpolation filter for intra prediction.

Embodiment 3. The method of Embodiment 1, wherein a look-up table of the interpolation filter for chrominance component is not the same as a look-up table of the interpolation filter for intra prediction.

Embodiment 4. The method of any one of Embodiments 1 to 3, wherein the interpolation filter is a 4 tap filter.

Embodiment 5. The method of any one of Embodiments 1 to 4, wherein the look-up table of the interpolation filter for chrominance component is

| Subpixel offset | $c_0$ | $c_1$ | $c_2$ | $c_3$ |
|---|---|---|---|---|
| 0 (integer) | 0 | 64 | 0 | 0 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 (half-pel) | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

Embodiment 6. A method for intra prediction, wherein the method comprises:
selecting an interpolation filter from a set of interpolation filters for intra prediction of a block.

Embodiment 7. The method of Embodiment 6, wherein the set of interpolation filters comprises a Gauss filter and a Cubic filter.

Embodiment 8. The method of Embodiment 6 or 7, wherein a look-up table of the selected interpolation filter is same as a look-up table of the interpolation filter for chrominance component.

Embodiment 9. The method of any one of Embodiments 6 to 8, wherein the selected interpolation filter is a 4-tap filter.

Embodiment 10. The method of any one of Embodiments 6 to 9, wherein the selected interpolation filter is a Cubic filter.

Embodiment 11. The method of any one of Embodiments 6 to 10, wherein a look-up table of the selected interpolation filter is

| Subpixel offset | $c_0$ | $c_1$ | $c_2$ | $c_3$ |
|---|---|---|---|---|
| 0 (integer) | 0 | 64 | 0 | 0 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 (half-pel) | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

Embodiment 12. An encoder comprising processing circuitry for carrying out the method according to any one of Embodiments 1 to 11.

Embodiment 13. A decoder comprising processing circuitry for carrying out the method according to any one of Embodiments 1 to 11.

Embodiment 14. A computer program product comprising a program code for performing the method according to any one of Embodiments 1 to 11.

Embodiment 15. A decoder, comprising:

one or more processors; and a non-transitory computer-readable storage medium coupled to the processors and storing programming for execution by the processors, wherein the programming, when executed by the processors, configures the decoder to carry out the method according to any one of Embodiments 1 to 11.

Embodiment 16. An encoder, comprising:
one or more processors; and
a non-transitory computer-readable storage medium coupled to the processors and storing programming for execution by the processors, wherein the programming, when executed by the processors, configures the encoder to carry out the method according to any one of Embodiments 1 to 11.

In one embodiment, a method of video coding is disclosed, the method comprises: inter-prediction process of a block, comprising subpixel interpolation filter (for example, One or, in general, several filters can be defined for MC interpolation) applied to luminance and chrominance samples of the reference block;
intra-prediction process of a block, comprising subpixel interpolation filter (for example, one or, in general, several filters can be defined for intra reference sample interpolation) applied to luminance and chrominance reference samples;
wherein subpixel interpolation filter is selected on the basis of the subpixel offset between reference and interpolated samples' positions and for the equal said subpixel offsets in intra-prediction and inter-prediction processes a filter of intra-prediction process (for example, for intra reference sample interpolation, one or more filters can be used) is selected to be the same as the filter for the inter-prediction process.

In another embodiment, a filter (for example, the only filter or one of the filter set can be used for intra-prediction process) of the intra-prediction process for a given subpixel offset is selected from a set of filters (for example, one or several filters can be available for MC interpolation), one of which is the same as a filter for inter-prediction process.

In another embodiment, filter applied to chrominance samples in inter-prediction process is the same as filter applied to luminance and chrominance reference samples in intra-prediction process.

In another embodiment, filter applied to luminance and chrominance samples in inter-prediction process is the same as filter applied to luminance and chrominance reference samples in intra-prediction process.

In another embodiment, filter of intra-prediction process is selected to be the same as a filter for inter-prediction process if size of the main reference side used in intra-prediction process is less than a threshold.

In another embodiment, the side size threshold is 16 samples.

In another embodiment, inter-prediction process is an intra block copy process.

In another embodiment, filters used in inter-prediction and intra-prediction processes are finite impulse response filters and their coefficients are fetched from the look-up table.

In another embodiment, the interpolation filter used in intra-prediction process is a 4 tap filter.

In another embodiment, the coefficients of the filter depend on the subpixel offset as follows:

| Subpixel offset | $c_0$ | $c_1$ | $c_2$ | $c_3$ |
| --- | --- | --- | --- | --- |
| 0 (integer) | 0 | 64 | 0 | 0 |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 (half-pel) | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 | wherein "Subpixel offset" column is defined in 1/32 subpixel resolution.

In another embodiment, the set of filters comprises a Gauss filter and a Cubic filter.

In another embodiment, an encoder comprises processing circuitry for carrying out the above methods.

In another embodiment, a decoder comprises processing circuitry for carrying out the above methods.

In another embodiment, a computer program product comprises a program code for performing the above methods.

In another embodiment, a decoder, comprises: one or more processors; and a non-transitory computer-readable storage medium coupled to the processors and storing programming for execution by the processors, wherein the programming, when executed by the processors, configures the decoder to carry out the above methods.

In another embodiment, an encoder, comprises: one or more processors; and a non-transitory computer-readable storage medium coupled to the processors and storing programming for execution by the processors, wherein the programming, when executed by the processors, configures the encoder to carry out the above methods.

What is claimed is:
1. A method of video encoding comprising:
selecting interpolation filter coefficients according to a subpixel offset between integer reference sample positions and fractional reference sample positions, wherein the interpolation filter coefficients are used for inter prediction of a current block or the interpolation filter coefficients are used for intra prediction of the current block, and wherein when a first subpixel offset used in the intra prediction is the same as a second subpixel offset used in the inter prediction, a same set of interpolation filter coefficients are selected for both the inter prediction and intra prediction, wherein the selected interpolation filter coefficients are cubic filter coefficients;

performing subpixel interpolation filtering on reference samples of the current block, according to the set of interpolation filter coefficients, to generate predicted values for the current block;

wherein selecting interpolation filter coefficients comprises selecting interpolation filter coefficients based on associations between subpixel offsets and interpolation filter coefficients that comprise:

| Subpixel offset | $c_0$ | $c_1$ | $c_2$ | $c_3$ |
|---|---|---|---|---|
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 (half-pel) | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 | wherein the subpixel offsets are defined in 1/32 subpixel resolution and $c_0$ to $c_3$ represent the interpolation filter coefficients.

2. The method of claim 1, wherein the selected filter coefficients are used for the subpixel interpolation filtering of chroma component of the reference samples of the current block in the inter prediction.

3. The method of claim 1, wherein the selected filter coefficients are used for the subpixel interpolation filtering of luma component of the reference samples of the current block in the intra prediction.

4. The method of claim 1, wherein interpolation filtering coefficients used in the inter prediction or the intra prediction are fetched from a look-up table.

5. The method of claim 1, wherein a 4 tap filter is used for the subpixel interpolation filtering.

6. A non-transitory computer-readable medium having program code stored thereupon, which, when executed by one or more processing devices, cause the one or more processing devices to perform operations comprising:

selecting interpolation filter coefficients according to a subpixel offset between integer reference sample positions and fractional reference sample positions, wherein the interpolation filter coefficients are used for inter prediction of a current block or the interpolation filter coefficients are used for intra prediction of the current block, and wherein when a first subpixel offset used in the intra prediction is the same as a second subpixel offset used in the inter prediction, a same set of interpolation filter coefficients are selected for both the inter prediction and the intra prediction, wherein the selected interpolation filter coefficients are cubic filter coefficients;

performing subpixel interpolation filtering on reference samples of the current block, according to the set of interpolation filter coefficients, to generate predicted values for the current block;

wherein selecting interpolation filter coefficients comprises selecting interpolation filter coefficients based on associations between subpixel offsets and interpolation filter coefficients that comprise:

| Subpixel offset | $c_0$ | $c_1$ | $c_2$ | $c_3$ |
|---|---|---|---|---|
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 (half-pel) | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 | wherein the subpixel offsets are defined in 1/32 subpixel resolution and $c_0$ to $c_3$ represent the interpolation filter coefficients.

7. The non-transitory computer-readable medium of claim 6, wherein the selected filter coefficients are used for the subpixel interpolation filtering of chroma component of the reference samples of the current block in the inter prediction.

8. The non-transitory computer-readable medium of claim 6, wherein the selected filter coefficients are used for the subpixel interpolation filtering of luma component of the reference samples of the current block in the intra prediction.

9. The non-transitory computer-readable medium of claim 6, wherein the interpolation filtering coefficients used in the inter prediction or the intra prediction are fetched from a look-up table.

10. The non-transitory computer-readable medium of claim 6, wherein a 4 tap filter is used for the subpixel interpolation filtering.

11. An encoder, comprising:
one or more processors; and
a non-transitory computer-readable storage medium coupled to the processors and storing programming for execution by the processors, wherein the programming, when executed by the processors, configures the encoder to carry out operations comprising:

selecting interpolation filter coefficients according to a subpixel offset between integer reference sample positions and fractional reference sample positions, wherein the interpolation filter coefficients are used for inter prediction of a current block or the interpolation filter coefficients are used for intra prediction of the current block, and wherein when a first subpixel offset used in the intra prediction is the same as a second subpixel offset used in the inter prediction, a same set of interpolation filter coefficients are selected for both the inter prediction and the intra prediction, wherein the selected interpolation filter coefficients are cubic filter coefficients;

performing subpixel interpolation filtering on reference samples of the current block, according to the set of interpolation filter coefficients, to generate predicted values for the current block;

wherein selecting interpolation filter coefficients comprises selecting interpolation filter coefficients based on associations between subpixel offsets and interpolation filter coefficients that comprise:

| Subpixel offset | $c_0$ | $c_1$ | $c_2$ | $c_3$ |
|---|---|---|---|---|
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 (half-pel) | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 | wherein the subpixel offsets are defined in 1/32 subpixel resolution and $c_0$ to $c_3$ represent the interpolation filter coefficients.

12. The encoder of claim 11, wherein the same selected filter coefficients are used for the subpixel interpolation filtering of chroma component of the reference samples of the current block in the inter prediction.

13. The encoder of claim 11, wherein the same selected filter coefficients are used for the subpixel interpolation filtering of luma component of the reference samples of the current block in the intra prediction.

14. The encoder of claim 11, wherein the interpolation filtering coefficients used in the inter prediction or the intra prediction are fetched from a look-up table.

15. The encoder of claim 11, wherein a 4 tap filter is used for the subpixel interpolation filtering.

* * * * *